United States Patent
Paul et al.

(10) Patent No.: US 11,980,824 B1
(45) Date of Patent: May 14, 2024

(54) PASSENGER OPERATED AMUSEMENT KARTS, PASSENGER OPERATED AMUSEMENT KART WHEEL ASSEMBLIES, METHODS FOR TRAVERSING AMUSEMENT KART TRACKS, AND METHODS FOR ENGAGING A PASSENGER OPERATED AMUSEMENT KART TO A TRACK

(71) Applicant: MAGCAR LLC, Coeur d'Alene, ID (US)

(72) Inventors: Brandon Paul, Coeur d'Alene, ID (US); Jim Styner, Coeur d'Alene, ID (US)

(73) Assignee: MAGCAR LLC, Coeur d'Alene, ID (US)

( * ) Notice: Subject to any disclaimer, the term of this patent is extended or adjusted under 35 U.S.C. 154(b) by 379 days.

(21) Appl. No.: 16/777,647

(22) Filed: Jan. 30, 2020

Related U.S. Application Data

(60) Provisional application No. 62/798,999, filed on Jan. 30, 2019, provisional application No. 62/798,987, filed on Jan. 30, 2019, provisional application No. 62/833,443, filed on Apr. 12, 2019.

(51) Int. Cl.
*A63G 25/00* (2006.01)
*B60B 19/00* (2006.01)

(52) U.S. Cl.
CPC ............ *A63G 25/00* (2013.01); *B60B 19/006* (2013.01); *B60B 2200/47* (2013.01); *B60B 2900/931* (2013.01)

(58) Field of Classification Search
CPC ......... A63H 33/26; B60L 13/00; B60L 13/04; B60L 13/06; B60B 19/006; B60B 2900/931; B60B 2200/47
USPC .......................... 472/85–86, 88, 89; 104/281
See application file for complete search history.

(56) References Cited

U.S. PATENT DOCUMENTS

| | | |
|---|---|---|
| 1,668,249 A | 5/1928 | Rich |
| 3,810,706 A | 5/1974 | Grimm et al. |
| 4,031,661 A | 6/1977 | Bernhard |
| 4,429,488 A | 2/1984 | Wessels |
| 5,188,567 A | 2/1993 | Volkov |

(Continued)

FOREIGN PATENT DOCUMENTS

| | | |
|---|---|---|
| DE | 1997657 | 11/1968 |
| EP | 0525657 | 2/1993 |

(Continued)

*Primary Examiner* — Kien T Nguyen
(74) *Attorney, Agent, or Firm* — Wells St. John P.S.

(57) ABSTRACT

Kart tracks are provided that can include a magnetic support material below a polymeric coating. Karts are provided that can include processing circuitry operatively coupled to at least one motion sensor and at least one kart control assembly. Methods for controlling passenger operated amusement karts are also provided. Karts are also provided that can include at least one lateral interchangeable battery assembly. Methods for providing power to a passenger operated amusement kart are also provided. Karts are also provided that can include an articulating chassis. Methods for traversing passenger operated amusement kart tracks are also provided. Kart wheel assemblies are also provided. Methods for engaging a passenger operated amusement kart to a track are provided.

3 Claims, 29 Drawing Sheets

(56) References Cited

U.S. PATENT DOCUMENTS

| | | | |
|---|---|---|---|
| 5,295,551 | A | 3/1994 | Sukonick |
| 5,380,231 | A | 1/1995 | Brovelli |
| 5,474,486 | A | 12/1995 | Chilton |
| 5,710,565 | A | 1/1998 | Shirai et al. |
| 5,901,806 | A | 5/1999 | Takahashi |
| 6,244,968 | B1 | 6/2001 | Arie |
| 6,396,178 | B1 * | 5/2002 | Chiu ............... H02K 7/1846 |
| | | | 310/67 R |
| 6,422,151 | B2 | 7/2002 | Maleika |
| 6,688,938 | B1 * | 2/2004 | Lee ................. A63H 17/26 |
| | | | 446/129 |
| 7,059,252 | B2 | 6/2006 | Guardo, Jr. |
| 7,389,730 | B2 | 6/2008 | Reuter |
| 7,722,427 | B2 | 5/2010 | Yamana |
| 7,749,047 | B2 | 7/2010 | Dunham |
| 7,950,333 | B2 | 5/2011 | Crawford et al. |
| 8,634,980 | B1 | 1/2014 | Urmson et al. |
| 8,850,989 | B2 * | 10/2014 | Hunter ............... B60L 13/04 |
| | | | 310/90.5 |
| 9,814,996 | B2 | 11/2017 | Janson |
| 2005/0216167 | A1 | 9/2005 | Nozawa et al. |
| 2007/0204759 | A1 | 9/2007 | Hunter |
| 2011/0223829 | A1 | 9/2011 | Sheltman |
| 2011/0294391 | A1 | 12/2011 | Todd |
| 2013/0340529 | A1 | 12/2013 | Lama |
| 2014/0230711 | A1 | 8/2014 | Lovelace et al. |

FOREIGN PATENT DOCUMENTS

| | | |
|---|---|---|
| FR | 2826917 | 1/2003 |
| GB | 1493343 | 11/1977 |
| JP | H 11276718 | 10/1999 |
| JP | 3374183 | 2/2003 |
| JP | 2004135690 | 5/2004 |

\* cited by examiner

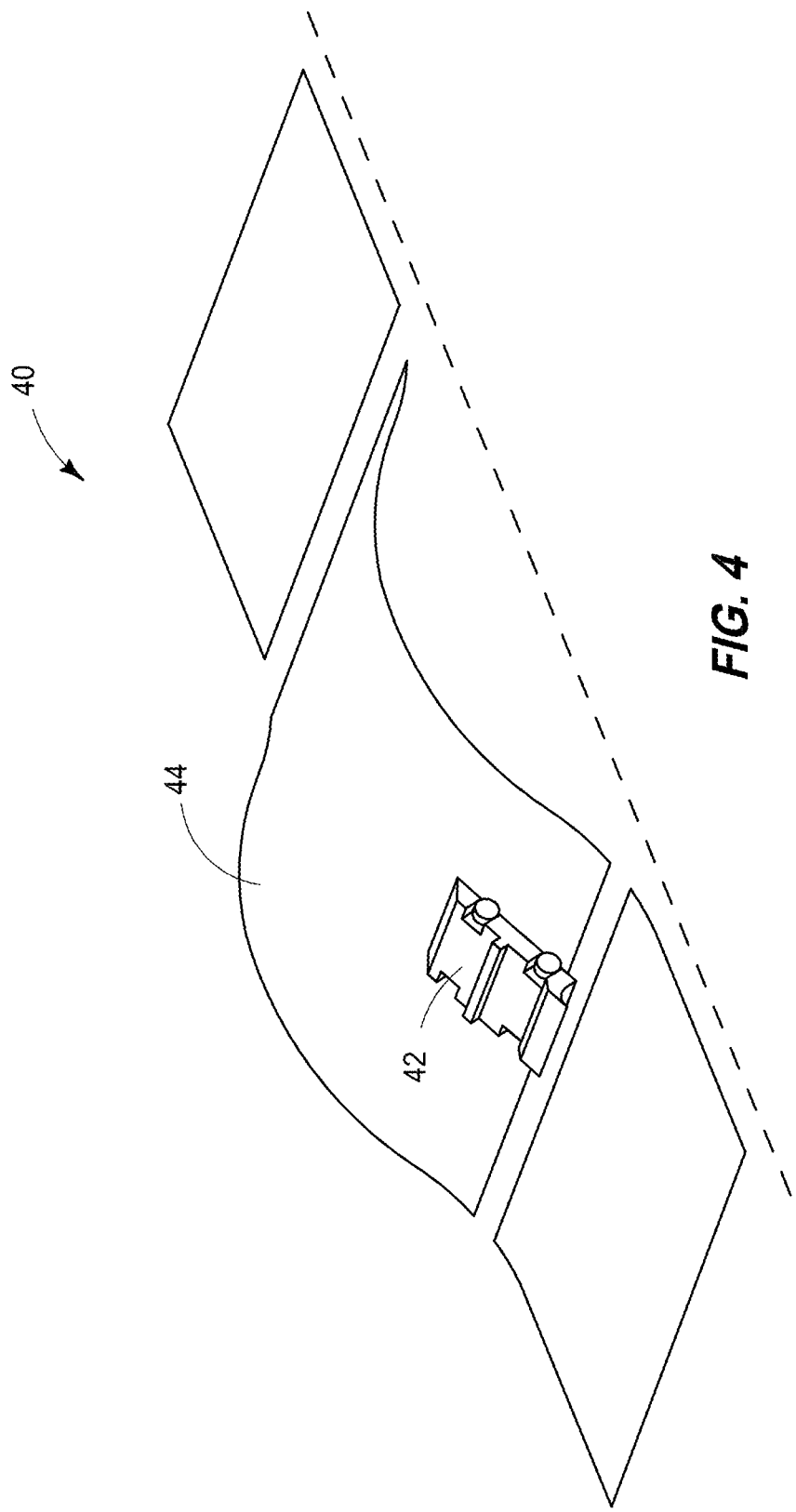

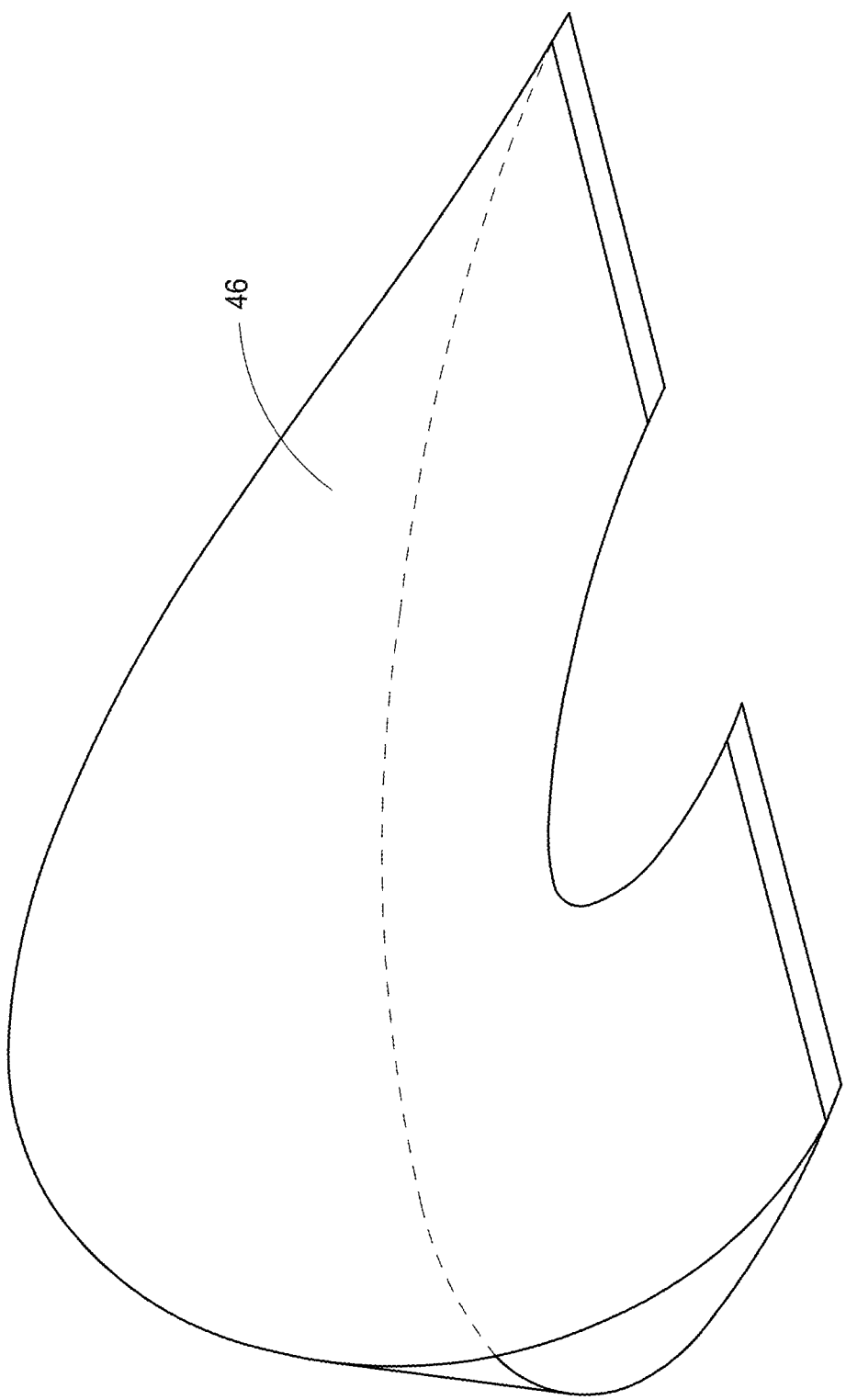

US 11,980,824 B1

PASSENGER OPERATED AMUSEMENT KARTS, PASSENGER OPERATED AMUSEMENT KART WHEEL ASSEMBLIES, METHODS FOR TRAVERSING AMUSEMENT KART TRACKS, AND METHODS FOR ENGAGING A PASSENGER OPERATED AMUSEMENT KART TO A TRACK

CROSS REFERENCE TO RELATED APPLICATIONS

This application claims priority to and the benefit of U.S. Provisional Patent Application Ser. No. 62/798,999 filed Jan. 30, 2019, entitled "Amusement Park Attractions, Amusement Karts, and Magnetic Assemblies"; U.S. Provisional Patent Application Ser. No. 62/798,987 filed Jan. 30, 2019, entitled "Amusement Karts, Amusement Kart Pathways, and Methods of Providing Entertainment to Riders of Amusement Karts"; and U.S. Provisional Patent Application Ser. No. 62/833,443 filed Apr. 12, 2019, entitled "Magnet Wheel Assemblies and Methods"; the entirety of each of which is incorporated by reference herein. U.S. patent application Ser. No. 15/799,888 filed Oct. 31, 2017, entitled "Amusement Park Attractions, Amusement Karts, and Magnetic Assemblies" is hereby incorporated by reference herein in its entirety.

TECHNICAL FIELD

The present disclosure relates to amusement vehicles and amusement rides, particularly amusement rides that utilize magnets to secure vehicles to tracks and amusement rides that utilize magnet assemblies of amusement vehicles and ferro-magnetic tracks. The present disclosure also provides inter-kart detection and accident prevention systems. The present disclosure also relates to amusement park rides and/or thrill rides. Particular embodiments provide rides that are passenger operated vehicles or steered, powered, and/or braked vehicles. The present disclosure also relates to traction methods for use with mobile items, including vehicles. The traction mechanisms can include magnet and wheel assemblies.

BACKGROUND

For decades, there has been a need to provide more and more exciting amusement rides for park visitors around the nation and the globe. These rides often times include steerable vehicles such as the classic go-kart ride or the bumper car ride, for that matter.

The present disclosure provides amusement vehicles and rides that utilize magnetized components. The present disclosure also relates generally to amusement park rides and more particularly to amusement karts and amusement kart pathways and methods of providing entertainment to riders of amusement karts. The present disclosure provides magnet and wheel assemblies and methods.

SUMMARY

Passenger operated amusement kart tracks are provided that can include a magnetic support material below a polymeric coating.

Passenger operated amusement karts are provided that can include processing circuitry operatively coupled to at least one motion sensor and at least one kart control assembly.

Methods for controlling passenger operated amusement karts are also provided. The methods can include using processing circuitry and motion detectors mounted to the amusement karts to determine the distance between active karts; using the processing circuitry to compare the distance to a distance limit; and using the processing circuitry to engage kart control when the distance limit has been breached.

Passenger operated amusement karts are also provided that can include at least one lateral interchangeable battery assembly.

Methods for providing power to a passenger operated amusement kart are also provided. The method can include providing a passenger operated amusement kart; providing power to the amusement kart with an interchangeable battery assembly; engaging the kart in an active amusement session on a track; and after the session, replacing a battery within the battery assembly with another battery.

Passenger operated amusement karts are also provided that can include an articulating chassis.

Methods for traversing passenger operated amusement kart tracks are also provided. The methods can include transitioning the kart between two different shaped portions of the track, with the transition causing the kart to articulate about portions of the kart chassis.

Passenger operated amusement kart wheel assemblies are also provided. The assemblies can include a kart wheel defining a recess within the wheel, and magnetized material within the recess.

Methods for engaging a passenger operated amusement kart to a track are provided. The methods can include providing magnetized material within a wheel of the kart, and magnetically coupling the material with magnetized material of the track, the coupling engaging the kart with the track.

DRAWINGS

Embodiments of the disclosure are described below with reference to the following accompanying drawings.

FIG. 4 is a track design including a passenger controlled amusement kart according to an embodiment of the disclosure.

FIG. 5 is a portion of a track design according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
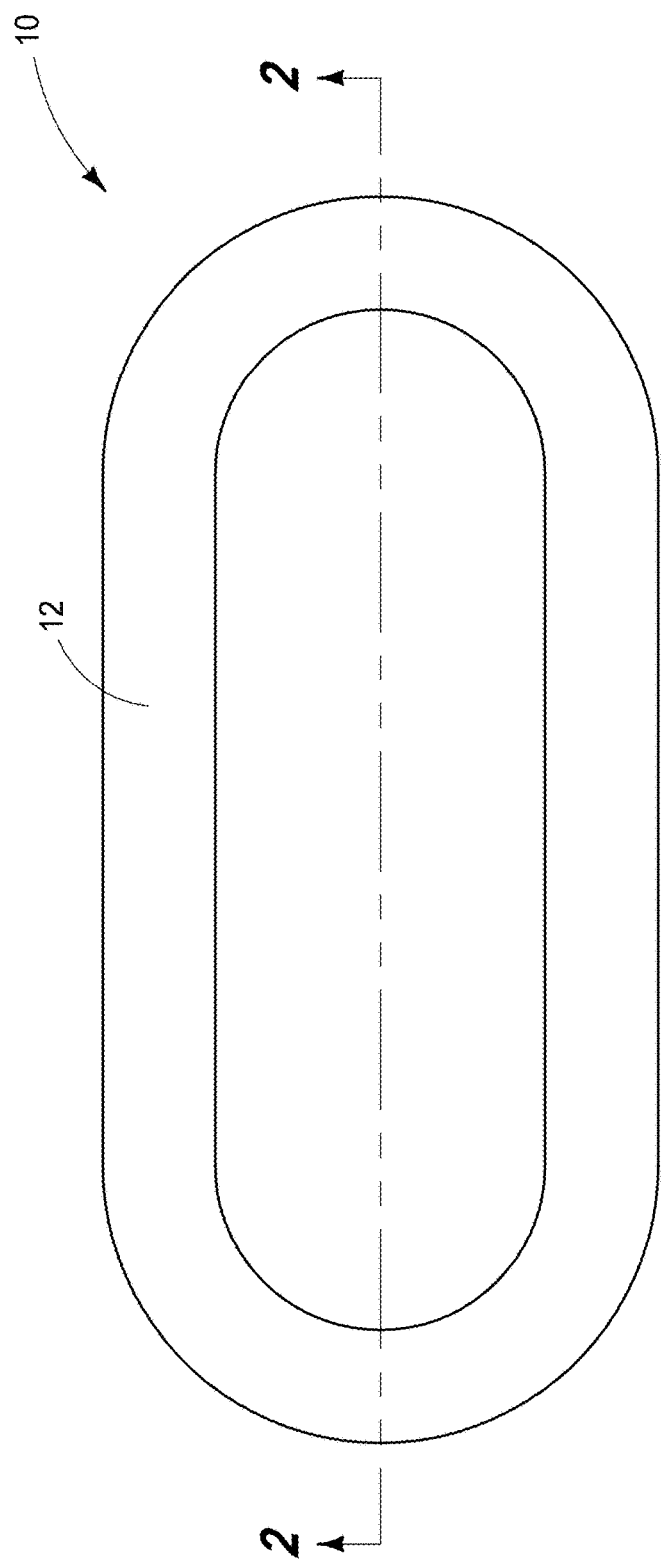
FIG. 1 is a track design according to an embodiment of the disclosure.
Figure 2:
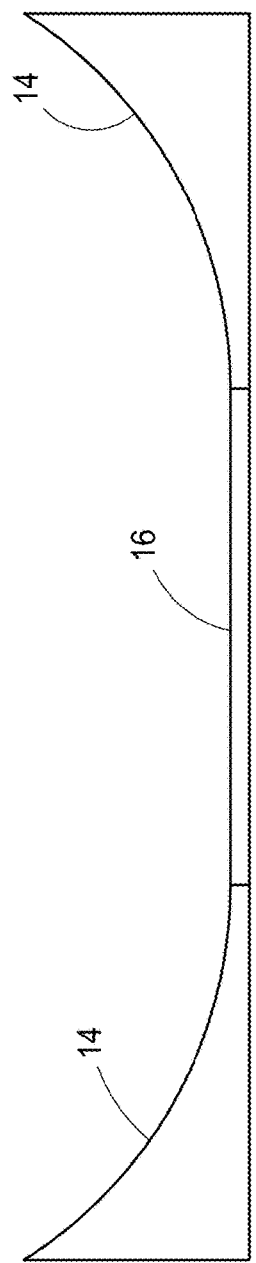
FIG. 2 is a side view of a track design according to an embodiment of the disclosure.
Figure 3A:
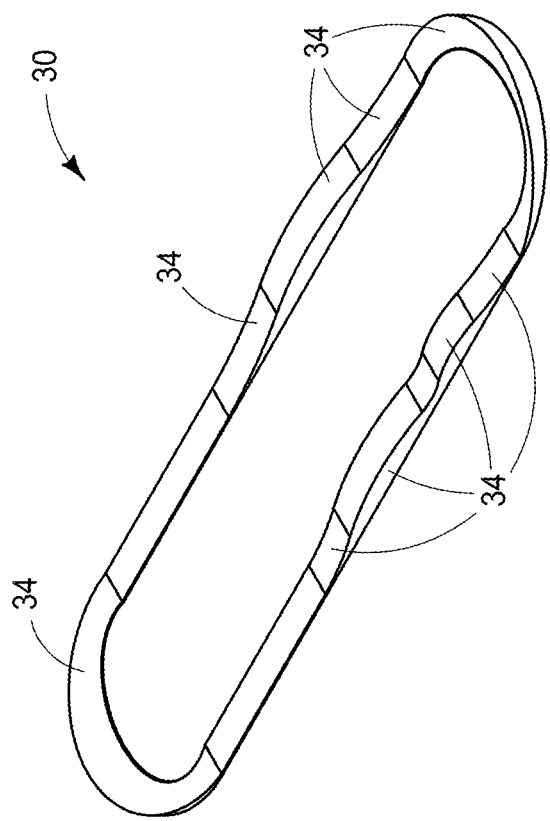
FIGS. 3A-3D are multiple views of a track design according to an embodiment of the disclosure.
Figure 3D:
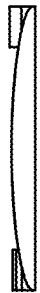
Figure 3B:
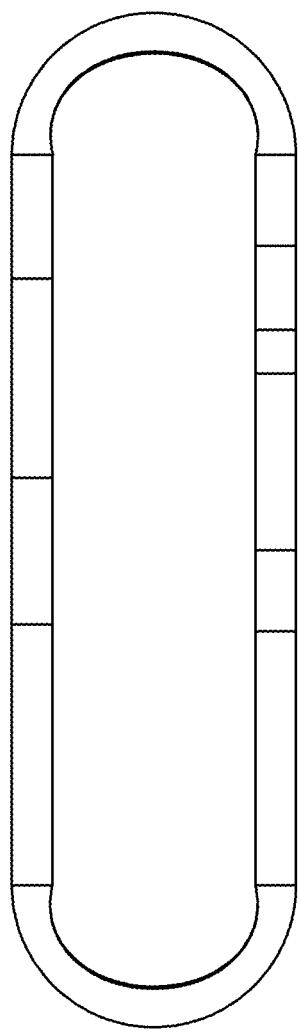
Figure 3C:
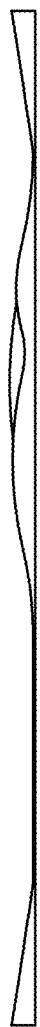

The present disclosure will be described with reference to FIGS. 1-41. Referring first to FIG. 1, a passenger operated amusement kart track 10 is shown that includes track 12. As shown in FIG. 2, the track can include banked edges or curved portions 14 and flat portion 16. Flat portion 16 can be constructed of a non-magnetic material support material such as wood, asphalt, or concrete, while banked edges 14 can be constructed of a magnetic material.

Referring next to FIGS. 3A-3D, a depiction of a complete track with hills and banked portions is shown, with the metal portion 34 represented at banks, upturns, downturns, and hill portions of the depicted track.

Referring next to FIG. 4, metal portion of track 44 is shown with passenger operated amusement kart 42 affixed thereto. Kart 42 in association with track 44 can ascend and descend hill portion 44 without becoming less affixed to track 44. In certain circumstances, kart 42 can ascend but not lose frictional advantage or become frictionally disadvantaged when descending track hill 44 because of its affixation thereto. Referring next to FIG. 5, track 44 can include a banked portion 46 of a track as shown.

Figure 6:
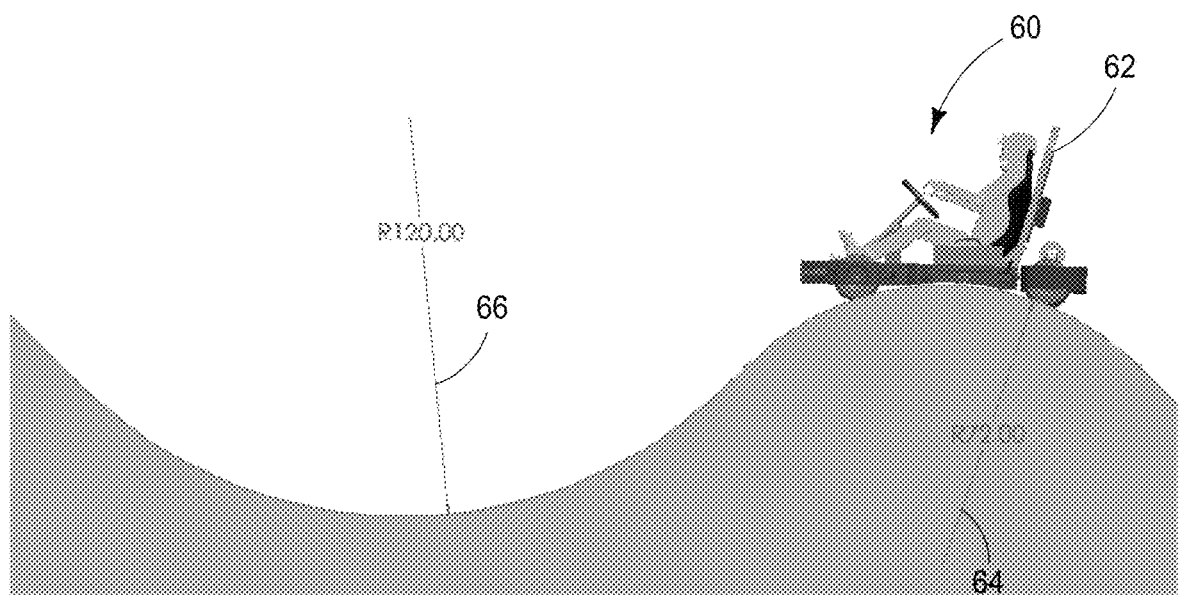
FIG. 6 is a cross sectional view of a portion of a track design including a passenger operated amusement kart.
Figure 7:
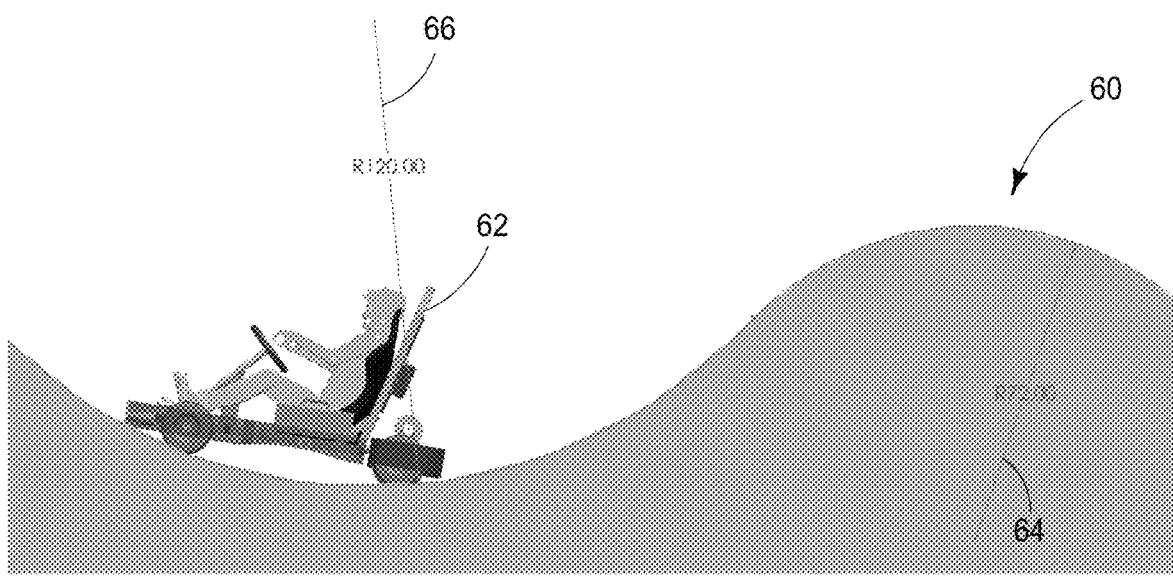
FIG. 7 is the track design and amusement kart of FIG. 6 as the passenger kart transitions over the track design according to an embodiment of the disclosure.

Referring next to FIGS. 6 and 7, track designs are shown to demonstrate clearances that can be cleared utilizing kart 62. In accordance with example implementations, there is a minimum 72" crown radius that can be cleared and a minimum 120" dip radius that can be cleared with a maximum 3 degree per foot twist radius as shown in FIGS. 6 and 7.

Figure 8:
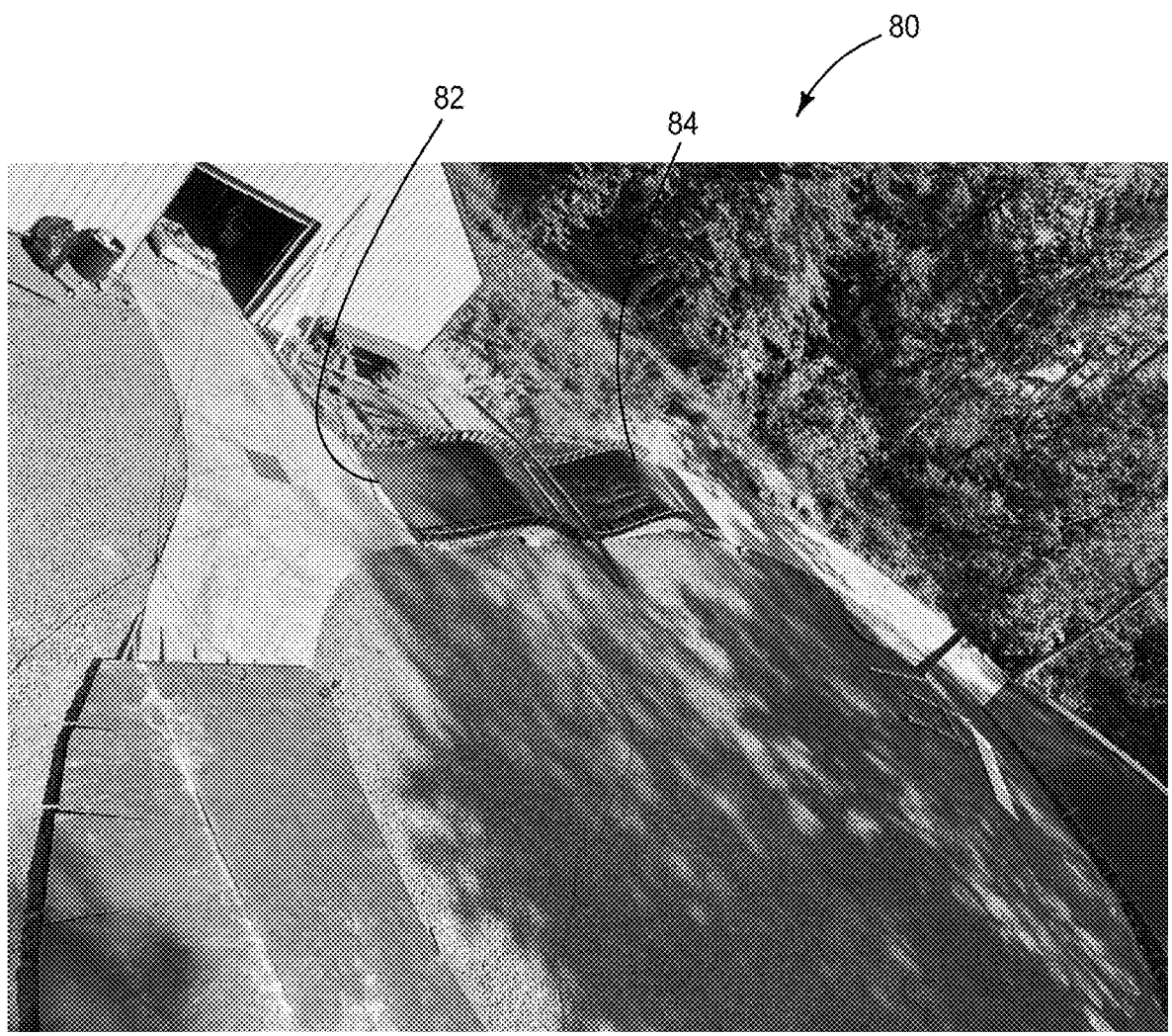
FIG. 8 is a depiction of a track design according to an embodiment of the disclosure.

Referring next to FIG. 8, a topical view of an example bunny hill is shown with the height from the beginning of the bunny hill at 82 to the top of the second bunny hill 82 being approximately 6 feet, within a span of approximately 12 feet.

Figures 9, 9A:
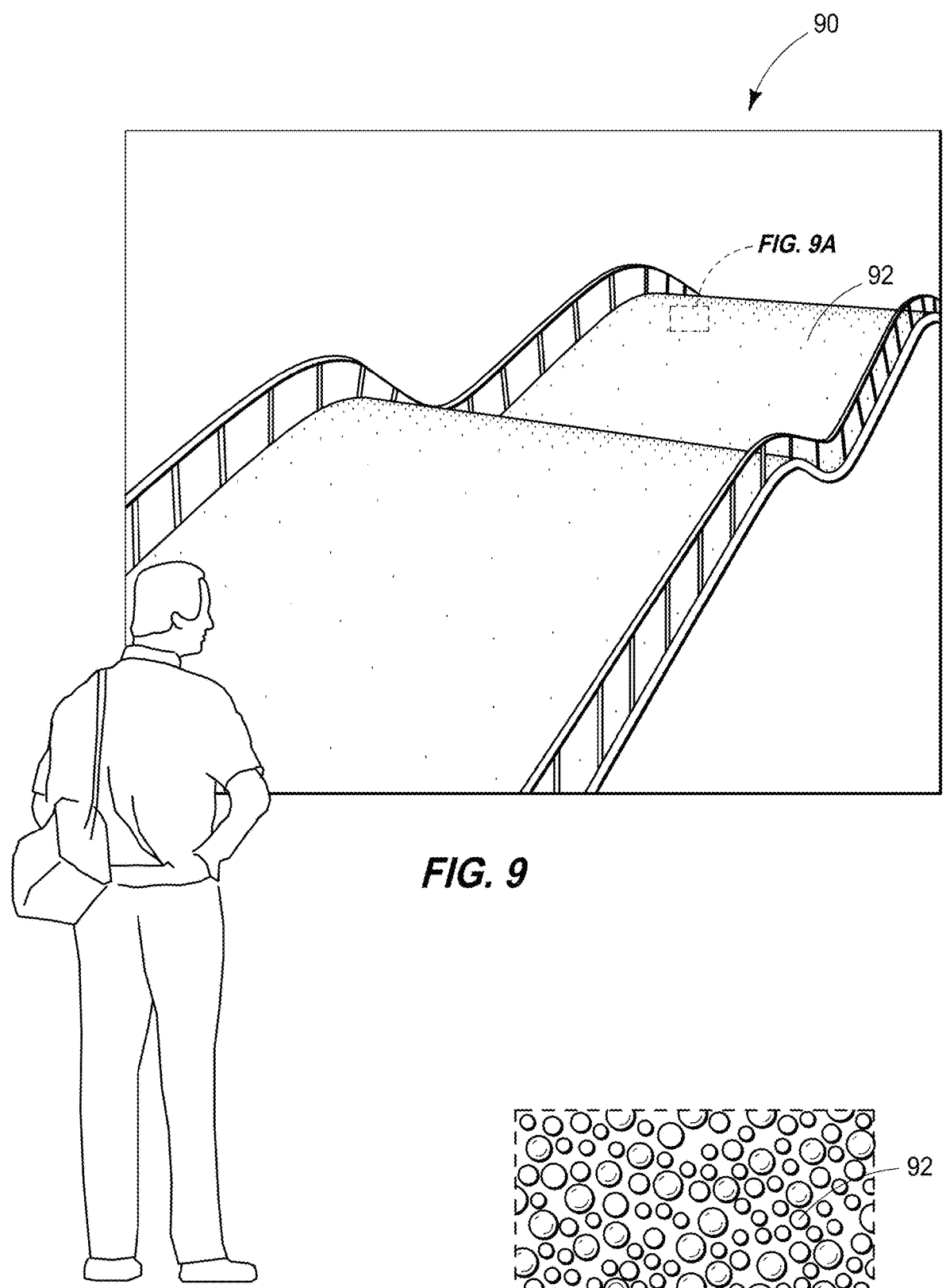
FIG. 9 is a more detailed view of the track design of FIG. 8 according to an embodiment of the disclosure.
FIG. 9A is a depiction of the textured composition of the surface of a portion of the track designs according to an embodiment of the disclosure.

Referring next to FIGS. 9 and 9A, the bunny hill of FIG. 8 is shown in more detail. This bunny hill can be constructed of magnetic material such as steel plating for example, but also include a surface 92 that resembles a roughened plastic polymeric surface such as the surfaces that have been utilized in bed liners. This can be a polymeric coating such as an isocyanate resin and/or an elastomeric polyurethane. While the bed liner uses have been demonstrated for avoiding damage to the steel surface, it has been recognized in the present application that this material can also be utilized to restrict slippage of karts on magnetic support material such as steel surfaces. Accordingly, the kart track can include a magnetic support material below a polymeric coating.

Figure 10:
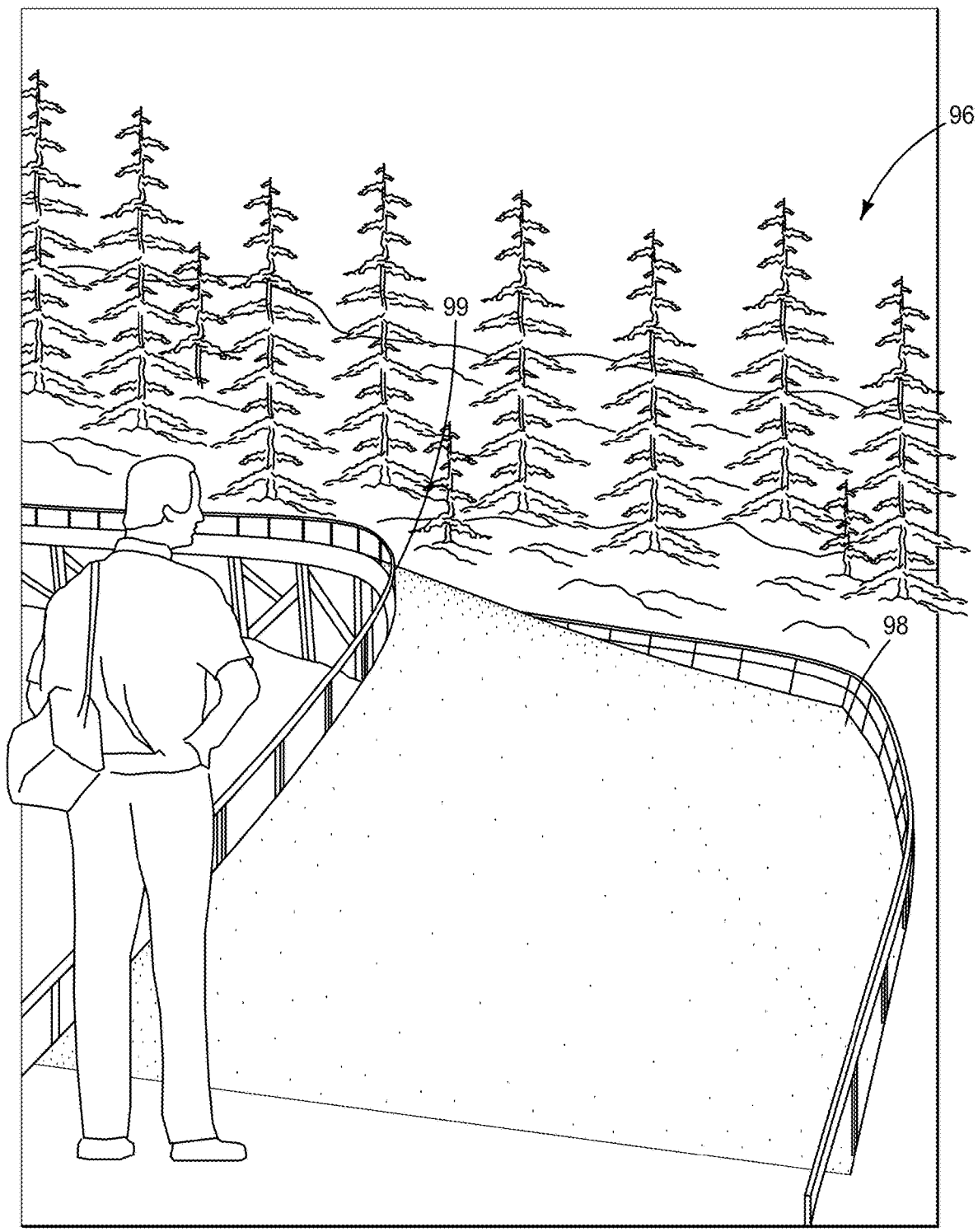
FIG. 10 is a track design according to an embodiment of the disclosure.

Referring next to FIG. 10, an example tilted portion of a track is shown. This curved portion is constructed of steel and is coated as well, with the lower minimum 98 and an upper minimum 99. The angle change between 98 and 99 is 22 degrees over a distance of 10 feet.

Figure 11:
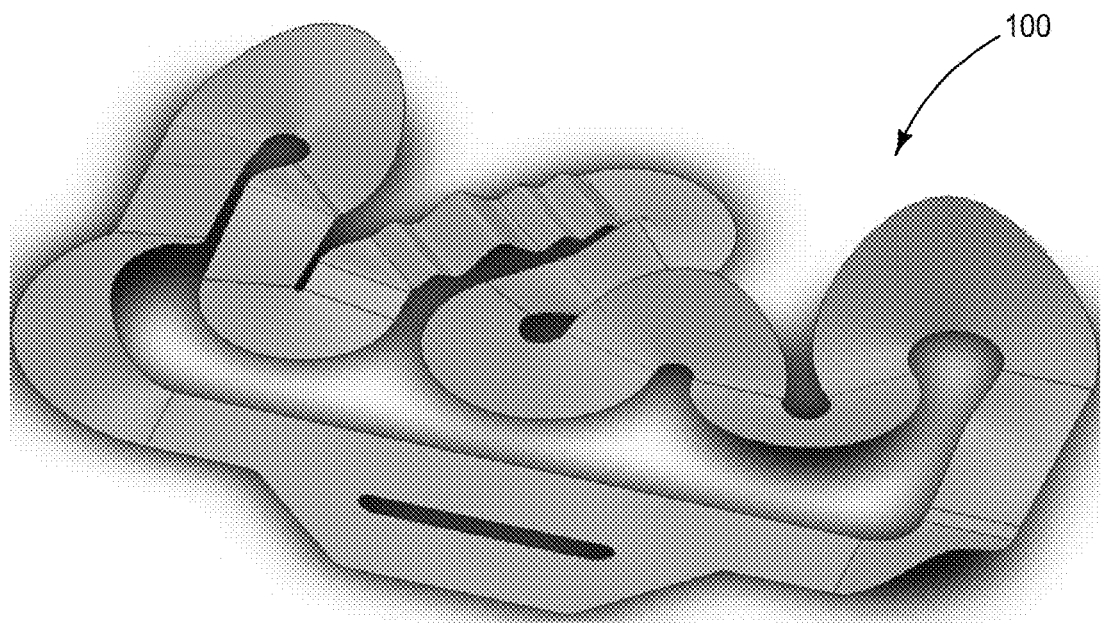
FIG. 11 is a track design according to an embodiment of the disclosure.
Figure 12:
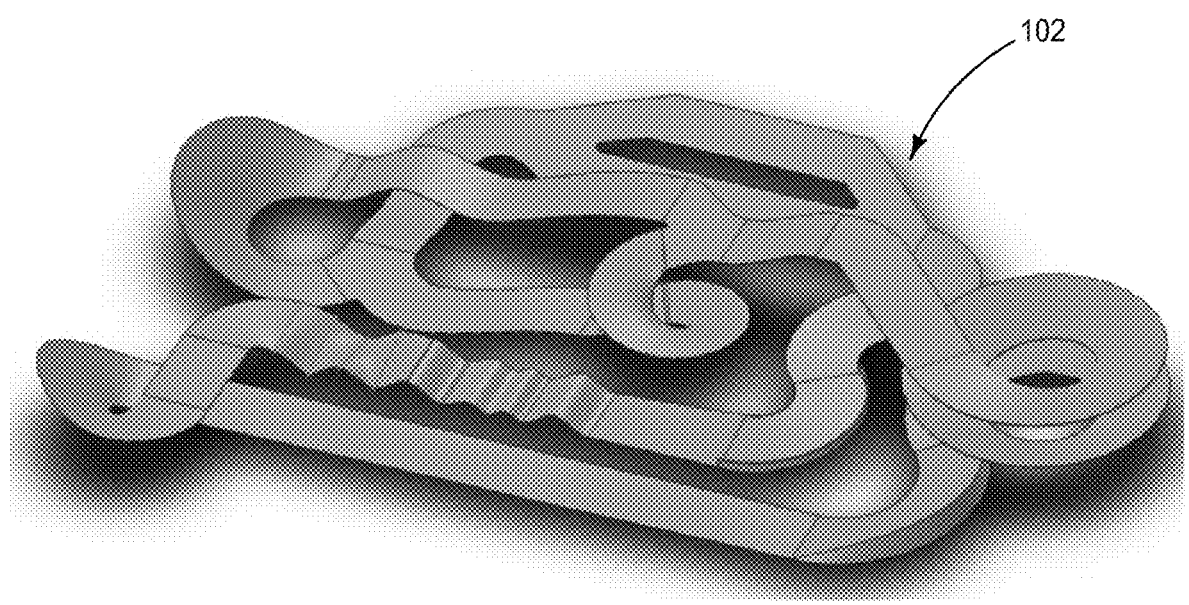
FIG. 12 is a track design according to an embodiment of the disclosure.

Referring next to FIGS. 11 and 12, example track designs are shown that can include negative G bunny hops as well as 22 degree outside banks and 45 degree inside banks, as well as forks that can play off of, or into, different portions of the track.

Figure 14:
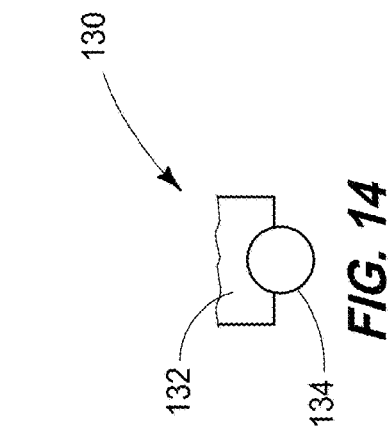
FIG. 14 is a portion of a kart design according to an embodiment of the disclosure.
Figure 13:
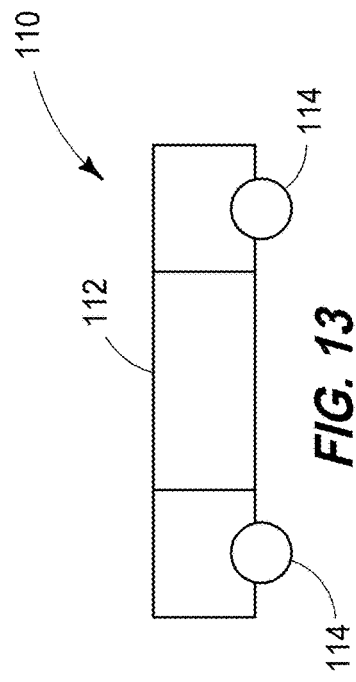
FIG. 13 is a passenger operated amusement kart according to an embodiment of the disclosure.
Figure 15:
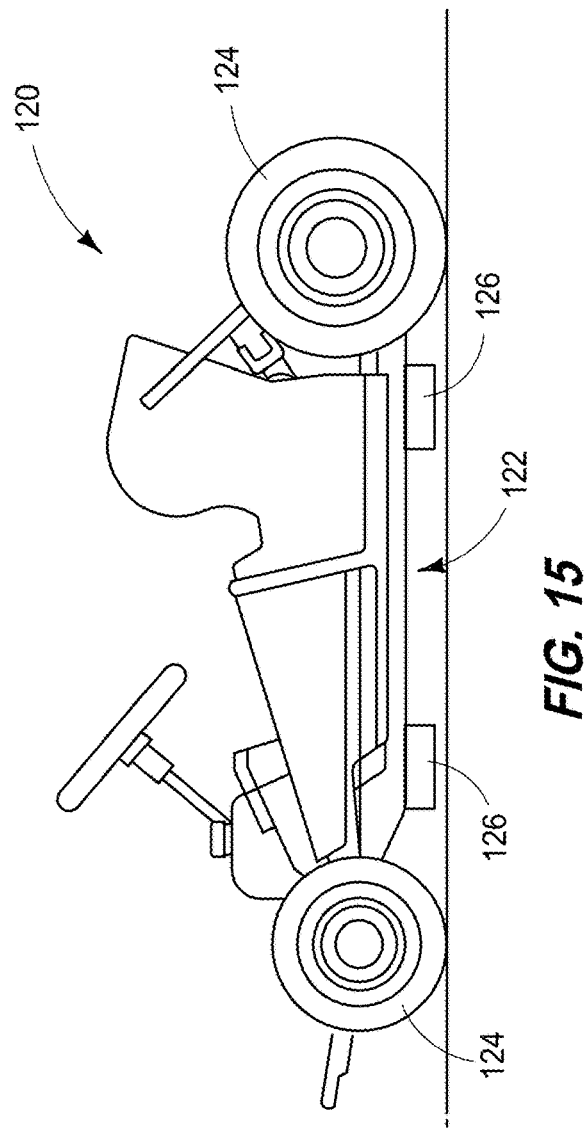
FIG. 15 is a passenger operated amusement kart according to an embodiment of the disclosure.

Referring next to FIG. 13, an amusement ride vehicle or passenger operated amusement kart 110 is shown that includes a frame or chassis portion 112 supported by wheel portions 114. Referring to FIG. 15, according to another embodiment, kart 120 is shown that includes a frame or chassis portion 122 supported by wheel portions 124 and magnetized portions 126 coupled to the frame portion 122. In accordance with example implementations, FIG. 14 represents a magnetized portion 130 that includes a substrate 132 as well as a gliding or semi-contact portion 134. Semi-contact portion 134 can be a rolling portion and/or combination with a magnetic portion that may slide but in typical circumstances the engagement of magnetic portion 342 to a metal portion of a track can be fluid.

Figure 16:
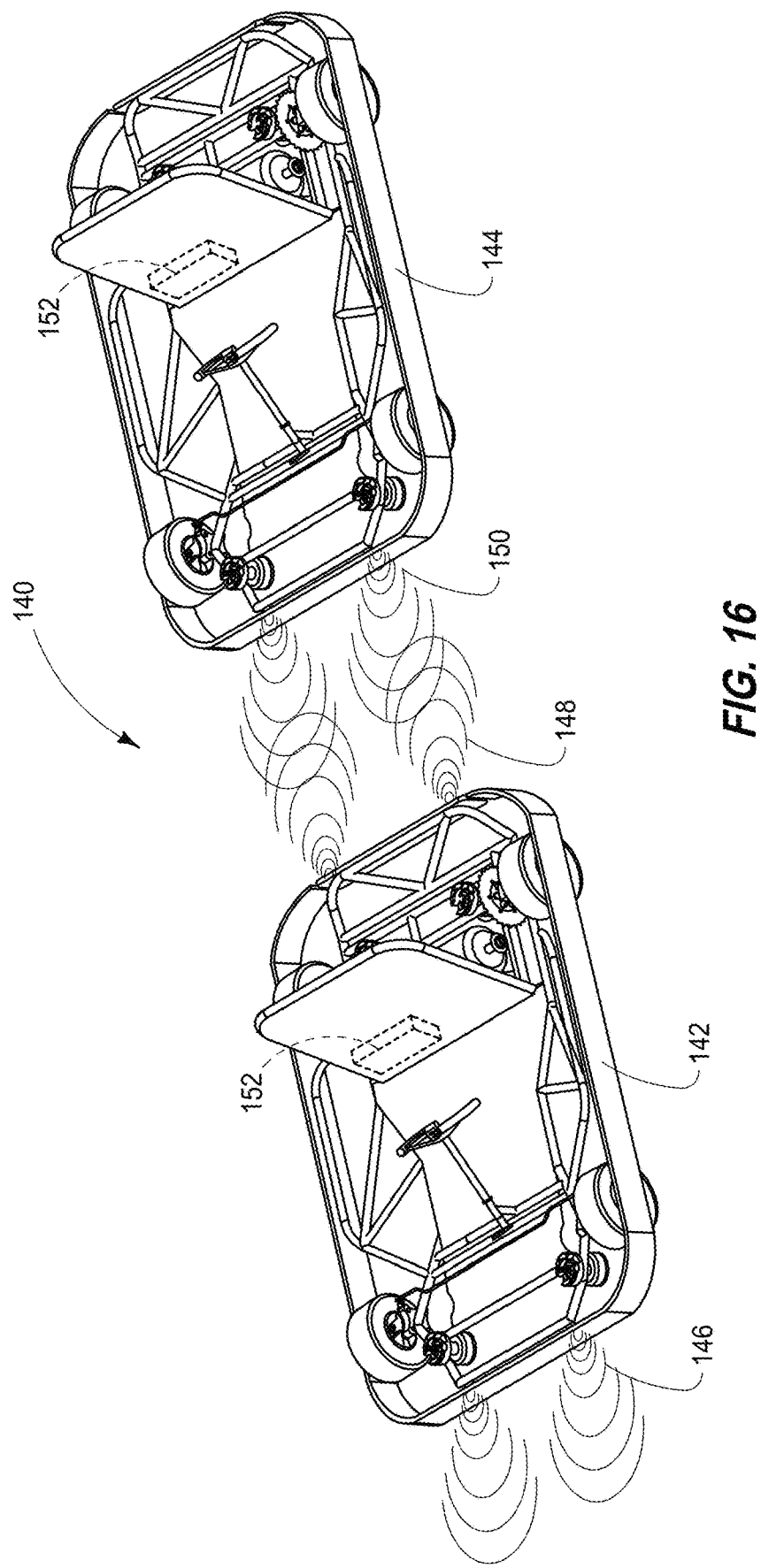
FIG. 16 depicts a pair of passenger operated amusement karts according to embodiments of the disclosure.

Referring next to FIG. 16, a pair of karts are depicted with a lead kart 142 arranged shown proceeding kart 144. Kart 142 can include front and rear sensors 146 and 148. These sensors can be considered sonar sensors configured to engage other karts such as kart 144. The sensors can also be configured to engage sensors of other karts such as sensors 150 of kart 144. Processing circuitry can be provided to receive sensor signals and slow or stop the progress of the kart that includes the sensors where signals are received or slow or stop karts that are detected by the sensors. This slowing or stopping can be facilitated through electronic accelerator or braking of the kart and/or through the use of the magnets associated with the karts. In accordance with example implementations, each of the karts can include process circuitry 152, which can include or be connected to a power source, such as a battery.

Figure 17:
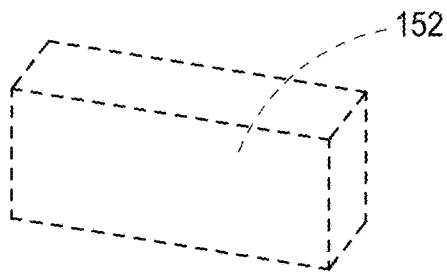
FIG. 17 is processing circuitry according to an embodiment of the disclosure.
Figure 18:
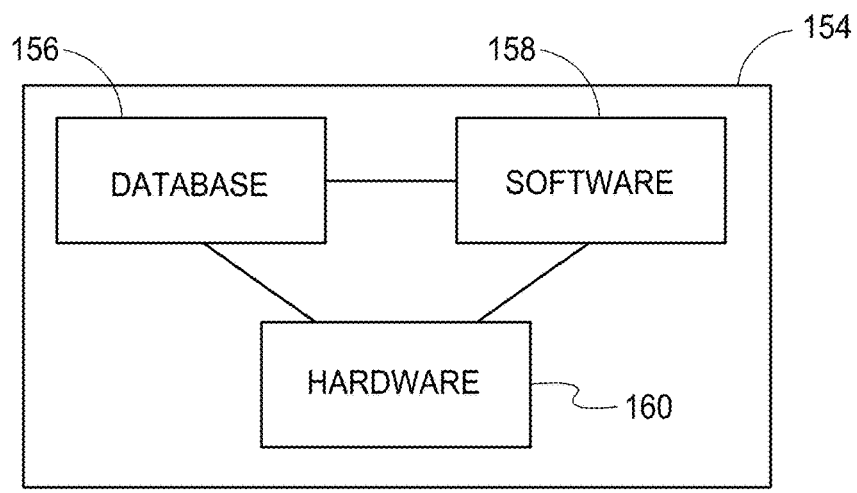
FIG. 18 is processing circuitry according to an embodiment of the disclosure.

Referring to FIG. 17, the processing circuitry 152 is shown, and in more detail with reference to FIG. 18, the processing circuitry 154 can include a database 156, software 158, and hardware 160.

The processing circuitry can include personal computing system that includes a computer processing unit that can include one or more microprocessors, one or more support circuits, circuits that include power supplies, clocks, input/output interfaces, circuitry, and the like. Generally, all computer processing units described herein can be of the same general type. The computing system can include a memory that can include random access memory, read only memory, removable disc memory, flash memory, and various combinations of these types of memory. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as financial institutions, insurance providers, and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

In accordance with example implementations, these processes may be utilized in connection with the processing circuitry described. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry include embedded systems such as (Raspberry PI/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

The systems of the present disclosure can include a server or cluster of servers, one or more devices, additional computing devices, several network connections linking devices to server(s) including the network connections, one or more databases, and a network connection between the server and the additional computing devices, such as those devices that may be linked to an adjuster.

Device or plurality of devices and the additional computing device can be any type of communication devices that support network communication, including a telephone, a mobile phone, a smart phone, a personal computer, a laptop computer, a smart watch, a personal digital assistant (PDA), a wearable or embedded digital device(s), a network-connected vehicle, etc. In some embodiments, the devices and the computing device can support multiple types of networks. For example, the devices and the computing device may have wired or wireless network connectivity using IP (Internet Protocol) or may have mobile network connectivity allowing over cellular and data networks.

The various networks may take the form of multiple network topologies. For example, networks can include wireless and/or wired networks. Networks can link the server and the devices. Networks can include infrastructure that support the links necessary for data communication between at least one device and a server. Networks may include a cell tower, base station, and switching network as well as cloud based networks.

In accordance with example implementations, the device can have the following functional components; one or more processors, memory, network interfaces, storage devices, power source, one or more output devices, one or more input devices, and software modules—operating the system and a motor vehicle glass claims application—stored in memory. The software modules can be provided as being contained in memory, but in certain embodiments, the software modules can be contained in storage devices or a combination of memory and storage devices. Each of the components including the processor, memory, network interfaces, storage devices, power source, output devices, input devices, operating system, the network monitor, and the data collector can be interconnected physically, communicatively, and/or operatively for inter-component communications.

The processor can be configured to implement functionality and/or process instructions for execution within the device. For example, the processor can execute instructions stored in the memory or instructions stored on a storage device. Memory can be a non-transient, computer-readable storage medium, and configured to store information within the device during operation. In some embodiments, memory can include a temporary memory, an area for information not to be maintained when the device is turned off. Examples of such temporary memory include volatile memories such as Random Access Memory (RAM), dynamic random access memories (DRAM), and Static Random Access Memory (SRAM). Memory can also maintain program instructions for execution by the processor.

The device can also include one or more non-transient computer-readable storage media. The storage device can be generally configured to store larger amounts of information than memory. The storage device can further be configured for long-term storage of information. In some embodiments, the storage device can include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The device can use network interfaces to communicate with external devices or server(s) via one or more networks, and other types of networks through which a communication with the device may be established. Network interfaces may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and Universal Serial Bus (USB).

The device can include one or more power sources to provide power to the device. Non-limiting examples of power source can include single-use power sources, rechargeable power sources, and/or power sources developed from nickel-cadmium, lithium-ion, or other suitable material.

One or more output devices can also be included in the device. Output devices can be configured to provide output to a user using tactile, audio, and/or video stimuli. Output device can include a display screen (part of the presence-sensitive screen), a sound card, a video graphics adapter card, or any other type of device for converting a signal into an appropriate form understandable to humans or machines. Additional examples of output device can include a speaker such as headphones, a Cathode Ray Tube (CRT) monitor, a Liquid Crystal Display (LCD), or any other type of device that can generate intelligible output to a user.

The device can include one or more input devices. Input devices can be configured to receive input from a user or a surrounding environment of the user through tactile, audio, and/or video feedback. Non-limiting examples of input device can include a presence-sensitive screen, a mouse, a keyboard, a voice responsive system, microphone or any other type of input device. In some examples, a presence-sensitive screen includes a touch-sensitive screen.

The device can include an operating system. The operating system can control operations of the components of the device. For example, the operating system can facilitate the interaction of the processors, memory, network interface, storage device(s), input device, output device, and power source.

Processor(s), analogous to processor(s) in the device, can be configured to implement functionality and/or process instructions for execution within the server. For example, processor(s) can execute instructions stored in memory or instructions stored on storage devices. Memory, which may be a non-transient, computer-readable storage medium, is configured to store information within server during operation. In some embodiments, memory includes a temporary memory, i.e., an area for information not to be maintained when the server is turned off. Examples of such temporary memory include volatile memories such as Random Access Memory (RAM), dynamic random access memories (DRAM), and static random access memories (SRAM). Memory also maintains program instructions for execution by processor(s).

The server uses network interface(s) to communicate with external devices via one or more networks. Such networks may also include one or more wireless networks, wired networks, fiber optics networks, and other types of networks through which communication between the server and an external device may be established. Network interface(s) may be a network interface card, such as an Ethernet card, an optical transceiver, a radio frequency transceiver, or any other type of device that can send and receive information.

Storage devices of the processing circuitry of the present disclosure can be provided as part of a server to include one or more non-transient computer-readable storage media. Storage devices are generally configured to store larger amounts of information than memory. Storage devices can be configured for long-term storage of information. In some examples, storage devices can include non-volatile storage elements. Examples of non-volatile storage elements can include, but are not limited to, magnetic hard discs, optical discs, floppy discs, flash memories, resistive memories, or forms of Electrically Programmable memory (EPROM) or Electrically Erasable and programmable (EEPROM) memory.

Referring next to FIG. 18, a passenger operated amusement kart is provided that can include processing circuitry operatively coupled to at least one motion sensor and at least one kart control assembly. The kart can include both front and rear motion sensors. The kart can also be configured to include two front motion sensors. The kart can include two rear motion sensors and/or two front and two rear motion sensors.

Figure 19:
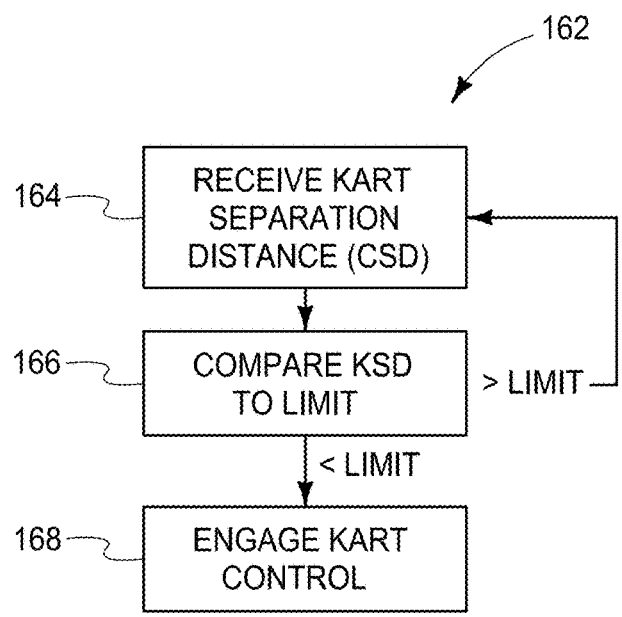
FIG. 19 is a method of engaging and disengaging kart control according to an embodiment of the disclosure.

Referring to FIG. 19, methods for controlling a passenger operated amusement karts are provided that can include using processing circuitry and motion detectors mounted to the amusement karts to determine the distance between active karts (kart separation distance, ksd) at step 164 of process 162, for example. Active karts can be considered those karts that are being operated by passengers during an amusement session. The methods can include using the processing circuitry to compare the distance (ksd) to a distance limit at step 166. The method can then include using the processing circuitry to engage kart control when the distance limit has been breached at step 168 for example.

In accordance with example implementations, the distance limit (ksd) is determined as an average of multiple determinations. Each of the multiple determinations can be averaged over time on the track during an active session.

The method can also include defining a breached distance limit as a threshold number of distance limit breaches during an active session or during a lap.

Kart control can include engaging the braking system of the kart, disengaging power to the kart, and/or disengaging operational control of the kart accelerator.

Figure 20:
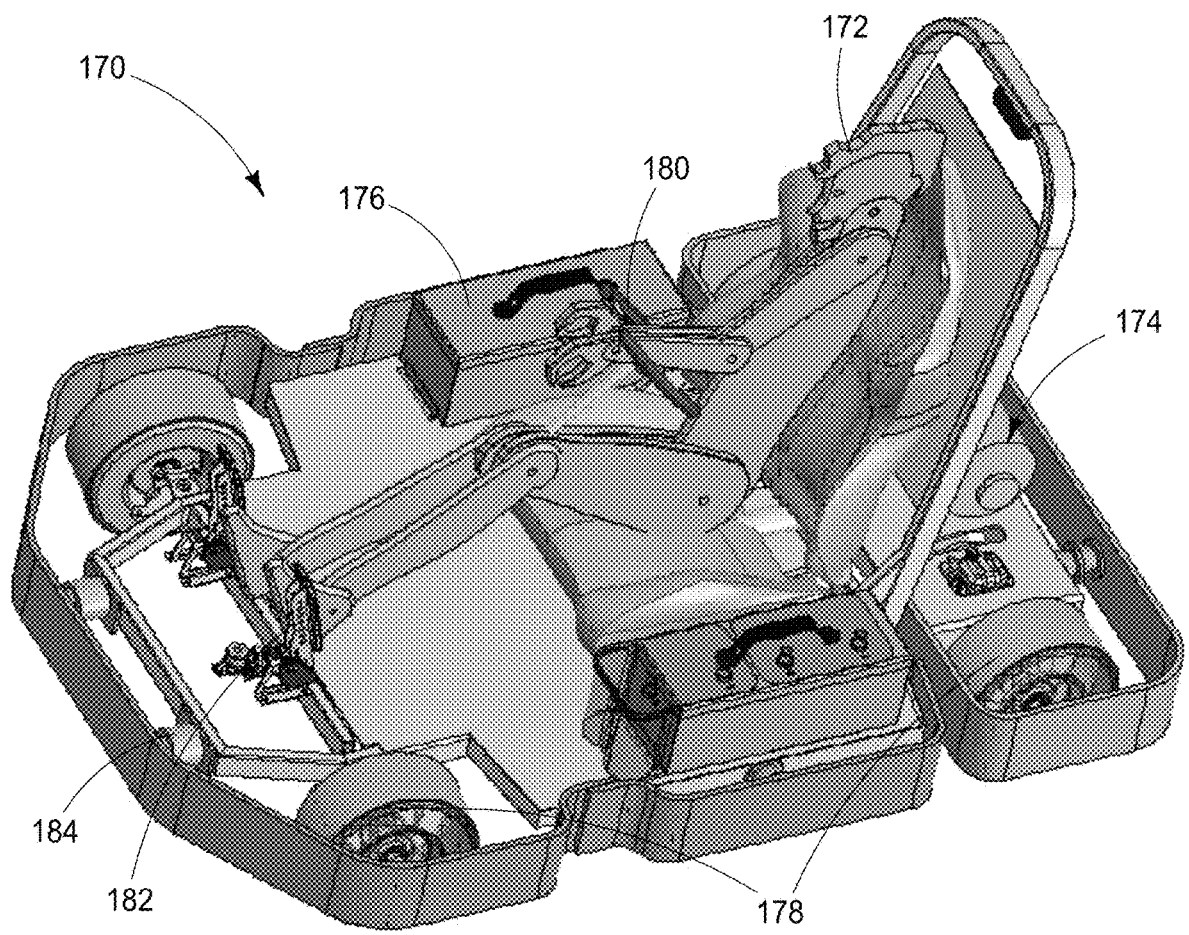
FIG. 20 is a passenger operated amusement kart according to an embodiment of the disclosure.

Referring next to FIG. 20, passenger operated amusement kart 170 can include a seating for passenger 172 and/or driver 172 or operator 172. Amusement kart 170 can be operated by a motor 174. This motor can be electric or gas as desired. Amusement kart 170 can include a power supply for the motor and/or the magnets to facilitate adherence to steel portions of an amusement park track. The power source 176 for the motor and/or magnets can be a custom high output lithium ion battery that offers long run times and quick replacement to minimize kart down time. Power source 176 can include an interchangeable battery assembly.

Wheels 178 of kart 170 can include wheel latching technology to ensure maximum control and safety on tracks. The magnets themselves can be inserted alongside the wheel, or even within the wheel itself. Kart 170 can also include restraint system 180 which can be a swing-away steering and customer restraint system to minimize unload and load times in between riders. Kart 170 can also include adjustable pedals and a restraint system that provide a comfortable experience for all riders 48" to 78" tall and up to 300 lbs. in weight. Additionally, kart 170 can also include a full perimeter impact guard 184 that can include front end hydraulic shock absorbers and collision avoidance sensors, for example.

Figure 21:
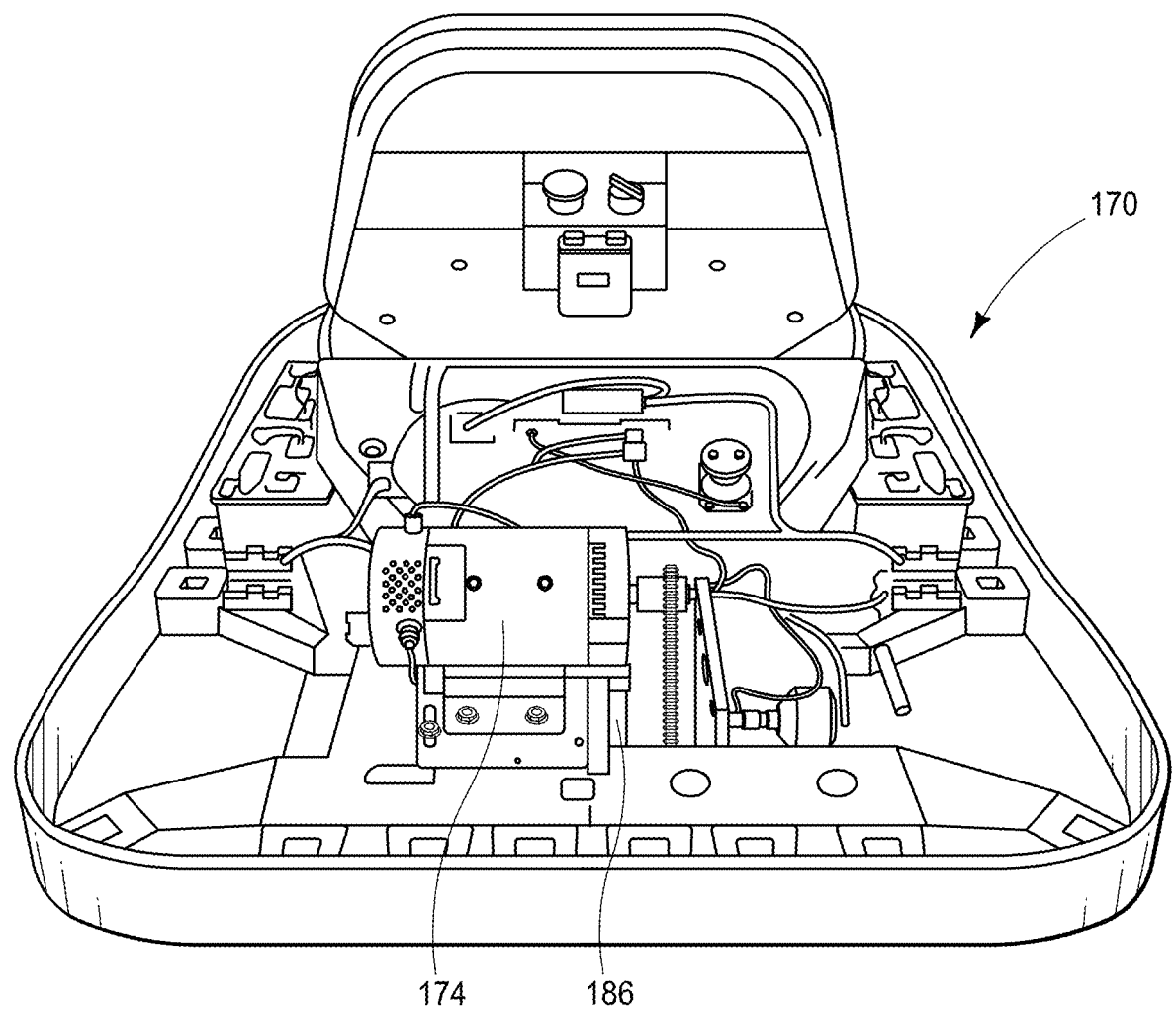
FIG. 21 is another view of a passenger operated amusement kart according to an embodiment of the disclosure.

Referring next to FIG. 21, kart 170 can be provided as a 3-wheel kart design with a single rear wheel located at a mid-width point between the rear width of kart 170. Accordingly, kart 170 can include three wheels with two of the wheels being front wheels for steering and operating the kart, as well as a third rear wheel. In accordance with example implementations as shown in FIG. 20, kart 170 can also include four wheels as well. The third rear wheel can have a magnet associated with it as well.

Figure 22:
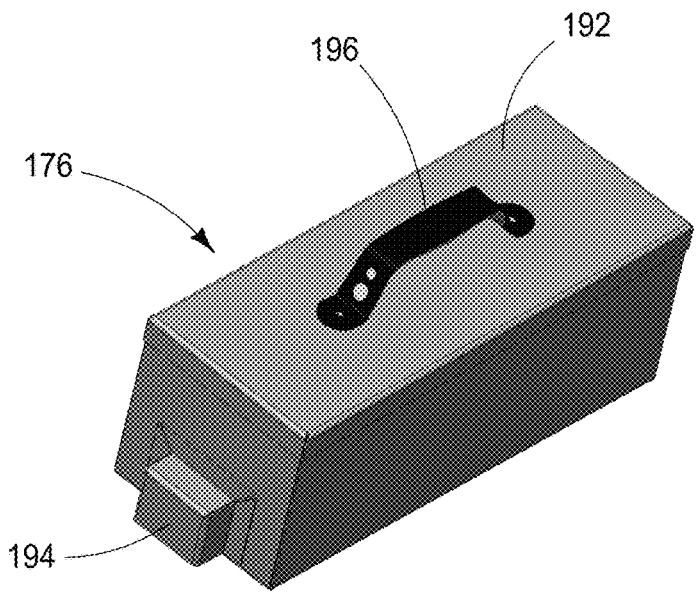
FIG. 22 is an interchangeable battery assembly according to an embodiment of the disclosure.
Figure 23:
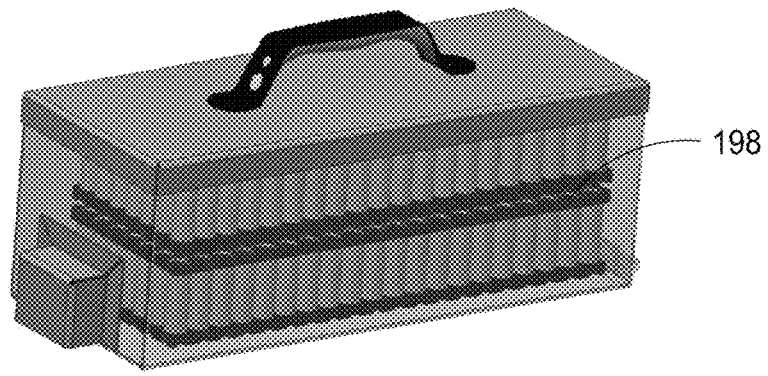
FIG. 23 is another depiction of the interchangeable battery assembly of FIG. 22 according to an embodiment of the disclosure.
Figure 24:
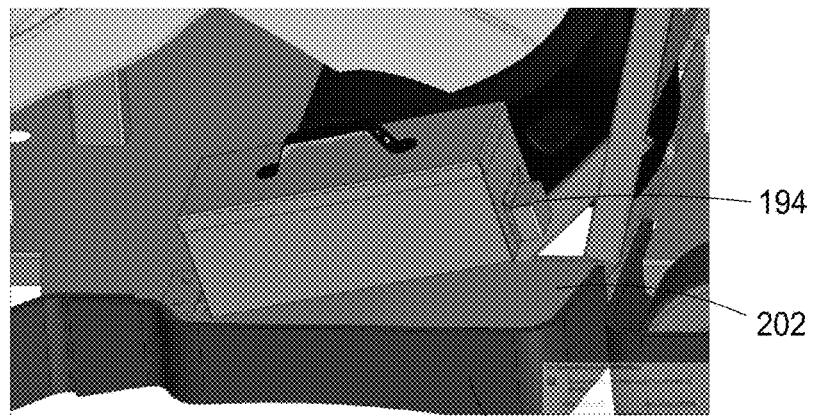
FIG. 24 is a depiction of the interchangeable battery assembly according to an embodiment of the disclosure.

Referring next to FIGS. 22-24, the amusement karts can include a power source 176 that include a case 192 or housing 192 that houses the battery cells, and these battery cells can be operatively coupled to a power interface 194 and include a handle 196. The power source 198 can be housed within the housing 192 and in operation, an operator can utilize handle 196 to place power source 176 within a well 200 of kart 170. Well 200 can include a complimentary coupling system 202, and well 200 can be complementary to the exterior perimeter of housing 192, for example. These power sources can be provided as two custom lithium ion battery packs, one on each side of the rider to balance kart 170. Each battery pack can contain 3 kilowatt hours of energy, for a total of 6 kilowatt hours, thus providing an estimated 15 minutes of continuous run time and can be changed with fresh batteries in less than 10 seconds. In accordance with example implementations, the battery can be hinged in the front and rotated down to automatically latch down and couple at the interface. The housing can be a fully welded and sealed steel enclosure, for example, and the internal battery cells can be encased in a shock absorbing envelope to limit damage during operation.

Accordingly, the passenger operated amusement kart can include at least one lateral interchangeable battery assembly. The kart can include another lateral interchangeable battery assembly. The kart can include a passenger seat, and the interchangeable batter assembly can be lateral one side of the passenger seat as shown in FIG. 20. The kart can include another lateral interchangeable battery assembly lateral another side of the passenger seat.

The interchangeable battery assembly can define a case 200 operably affixed to a chassis of the kart. The case can include an interface 202 configured to couple to an interchangeable battery, at for example interface 194. Accordingly, the interface can include portions of the base of the case and base of the battery. The interface can be electrically coupled to electrical components such as an electric motor and/or electric magnets for example.

Methods for providing power to a passenger operated amusement kart are provided that can include providing a passenger operated amusement kart having the battery assemblies described. The methods can include providing power to the amusement kart with the interchangeable battery assembly or assemblies, and/or engaging the kart in an active amusement session on a track, and after the session, replacing a battery within the battery assembly with another battery.

The methods can include providing a charging station proximate the track that houses and charges batteries. As shown, the kart can include two interchangeable battery assemblies, each affixed to opposing lateral sides of the chassis of the kart, the method can include providing opposing charging stations proximate opposite sides of the track. In accordance with example implementations, after the session, the method can include receiving the kart between the two charging stations, and exchanging at least one of the batteries within the interchangeable battery assembly for a battery within at least one of the stations, as an example, both batteries can be exchanged for batteries within the opposing charging stations.

In accordance with example implementations, the amusement kart collision avoidance system mentioned with reference to FIG. 20 can utilize ultrasonic sensors to sense when approaching an object or another amusement kart. When the object is sensed, a signal is sent to the on-board processing circuitry to reduce or cut power. Full power will be resumed when the sensed region is cleared.

Figure 25:
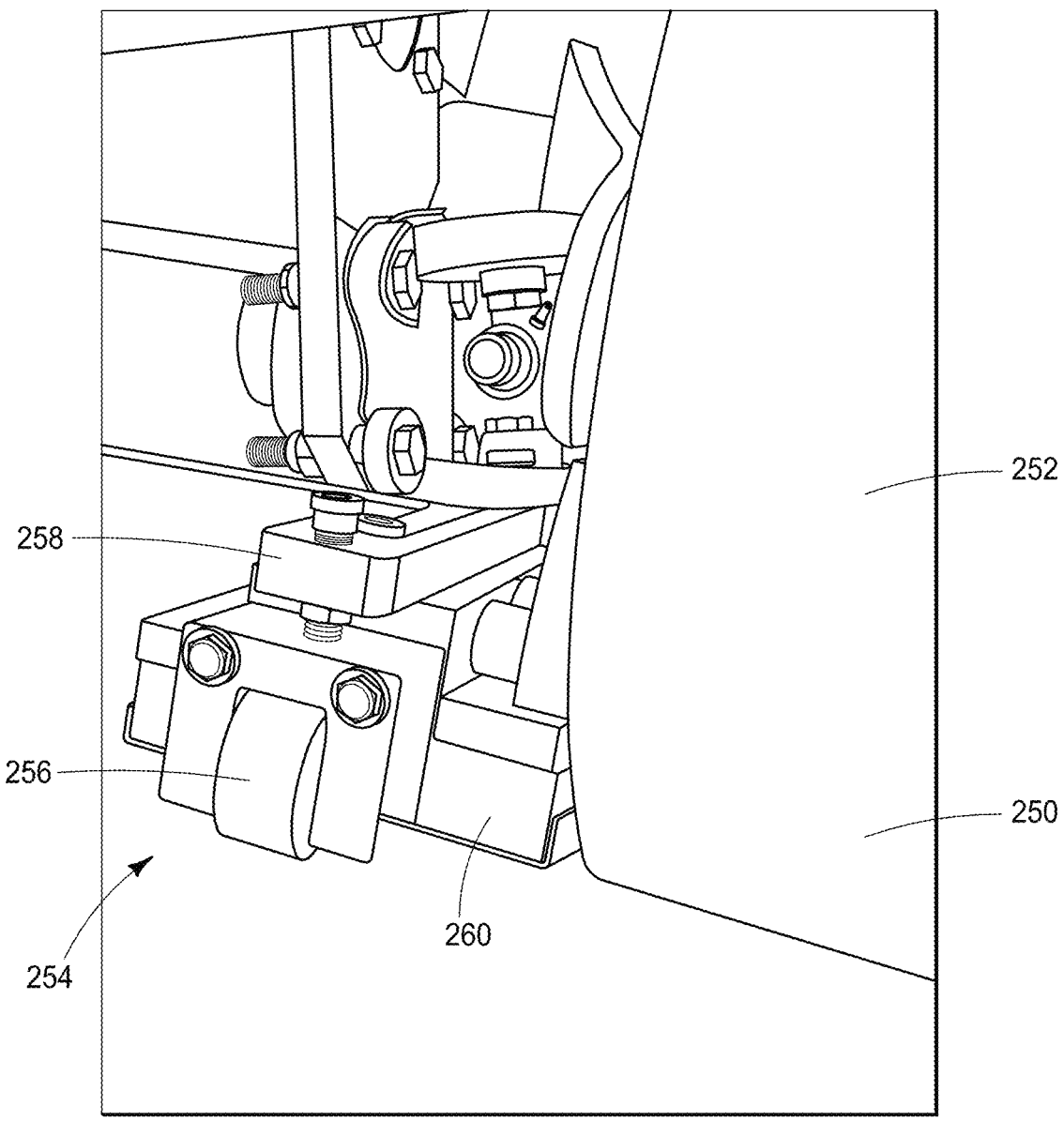
FIG. 25 is an amusement kart magnet assembly according to an embodiment of the disclosure.

Referring next to FIG. 25, wheel assembly 250 is shown that includes wheel 252 operatively aligned with magnet assembly 254. As shown, magnet assembly 254 is within 8 inches of the interior wall of wheel 252 and magnet assembly 254 is within 2 inches of the surface upon which wheel 252 resides. Magnet assembly 254 can include a cushion wheel 256 as well as a rocker plate 258, and an electrically driven magnet 260.

Figure 26:
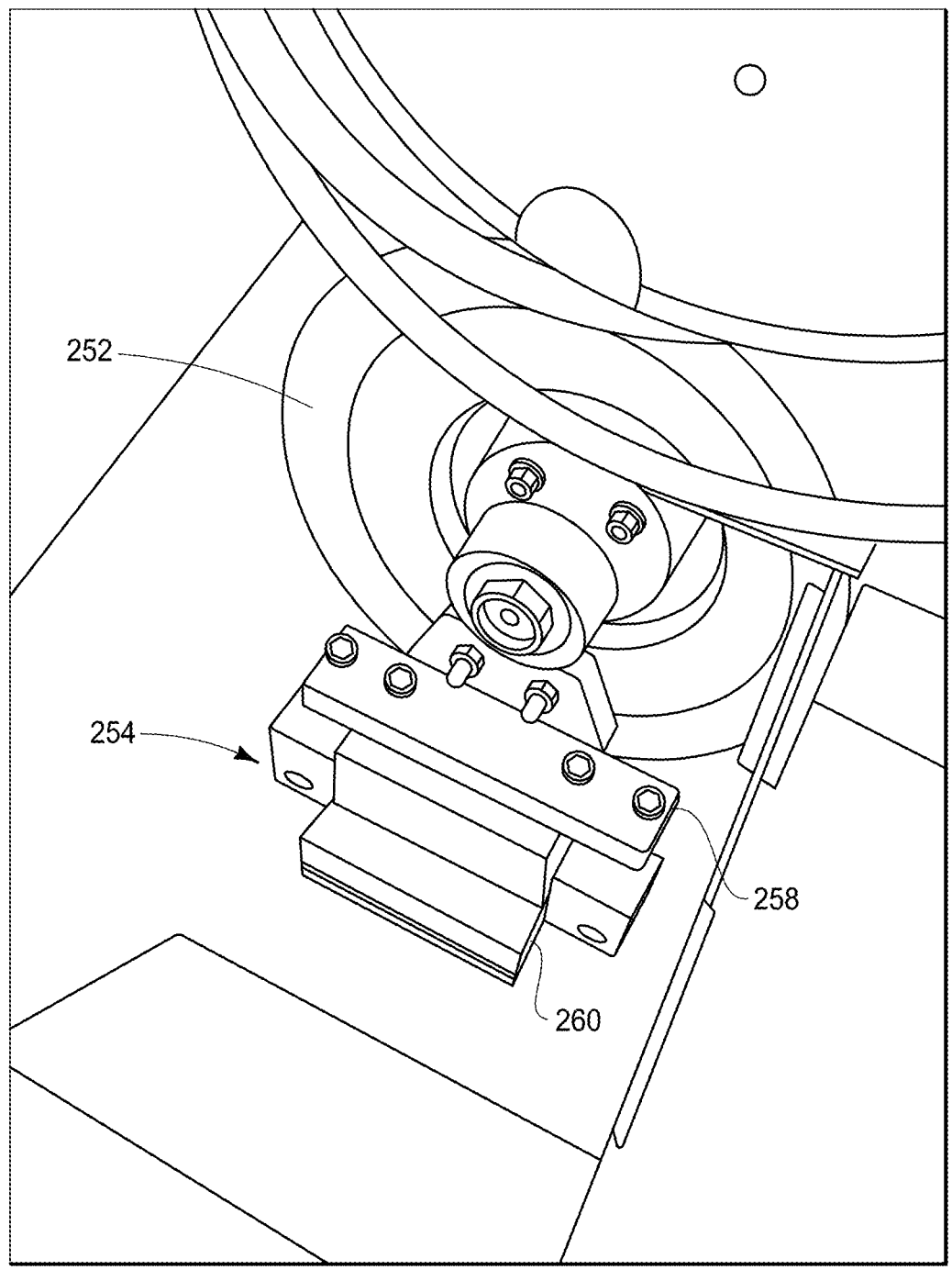
FIG. 26 is another view of an amusement kart magnet assembly according to an embodiment of the disclosure.
Figure 27:
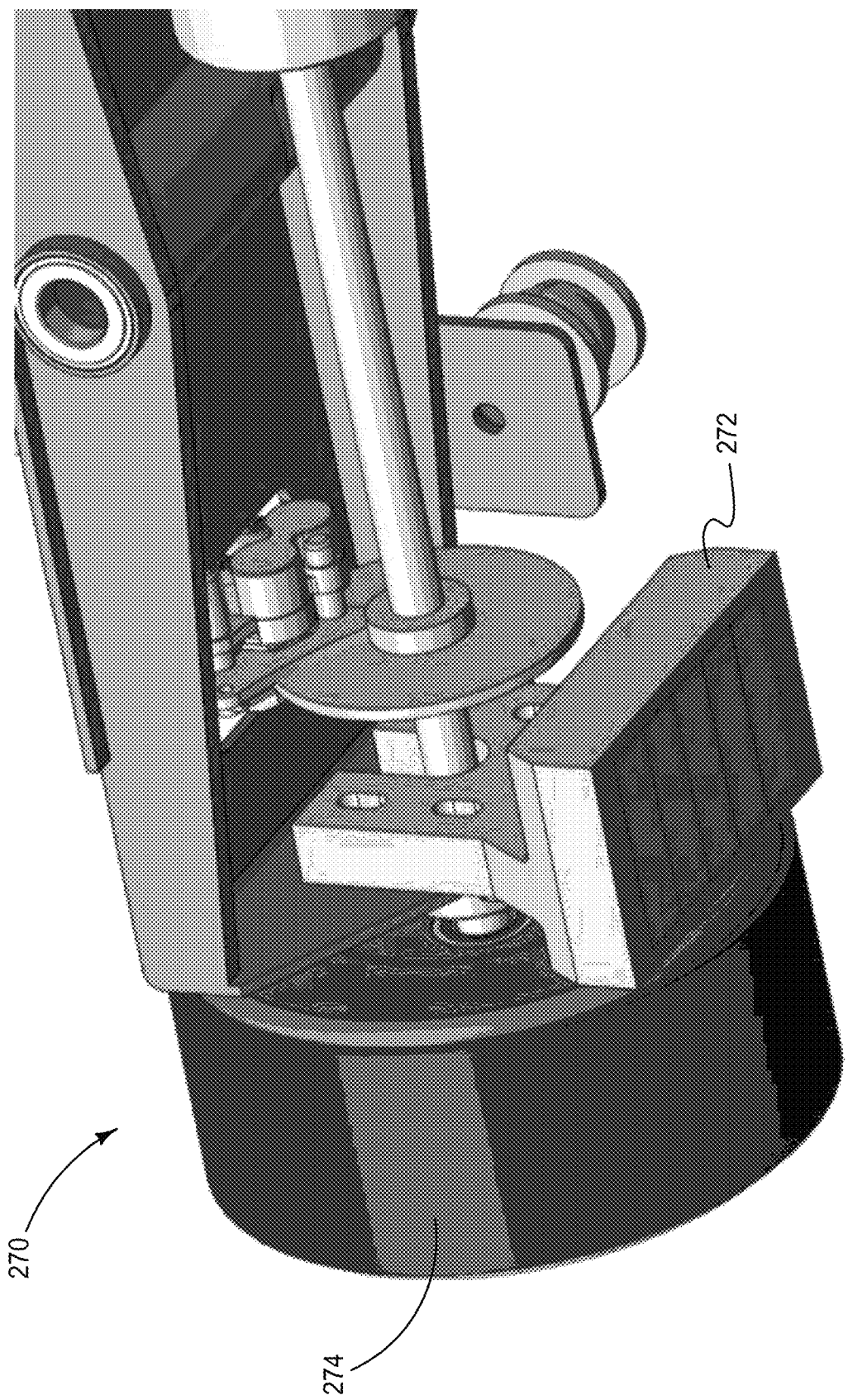
FIG. 27 is a depiction of an amusement kart magnet assembly according to an embodiment of the disclosure.
Figure 28:
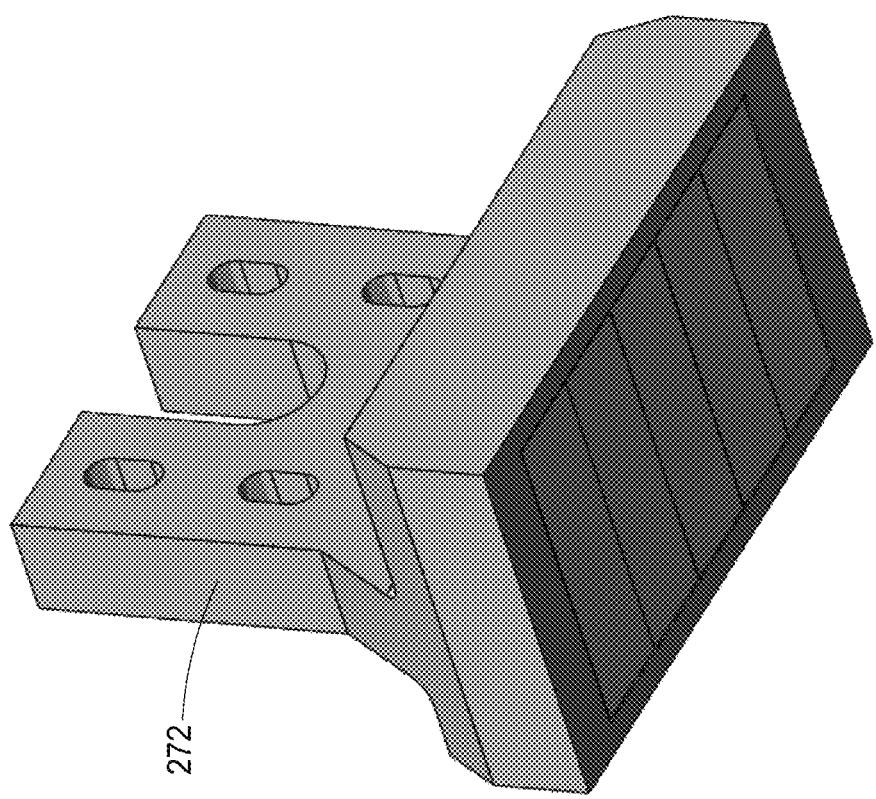
FIG. 28 is a depiction of a component of an amusement kart magnet assembly according to an embodiment of the disclosure.

Referring next to FIG. 26, a more detailed view of a single rear wheel assembly of kart 170 is shown that includes wheel 252 operatively associated with magnet assembly 254 having magnet 260 below rocker assembly 258.

Referring next to FIGS. 27-30, an example magnet wheel combination assembly 270 is shown. In accordance with example implementations, a magnet component 272 can be placed upon or proximate an axle, but proximate wheel 274 and held in position with a separate holder positioned adjacent to wheel 274. The magnets of component 272 can be arranged in a flat or radial or arcuate orientation. For example, with reference to FIG. 29, a radial or arcuate magnet component 292 is shown in relation to a wheel 294 in magnet assembly 290. Component 292 can be either be fixed to the chassis, hang from a rotating axle, or affixed to the wheel hub. When fixed to the axle or hub, a bearing assembly can allow for the magnet component to retain its position to the ferromagnetic road surface while the wheel rotates. Additional magnets may also be provided in proximity to the wheel along the same or different axis and the magnets may be arranged in a north-south array or Halbach array, for example.

The magnets utilized herein may be permanent magnets and/or electro-magnets that can be energized from a separate power source (e.g. onboard batteries or a generator). Electro-magnets can be turned off, self-cleaning, and/or made adjustable.

Figure 31:
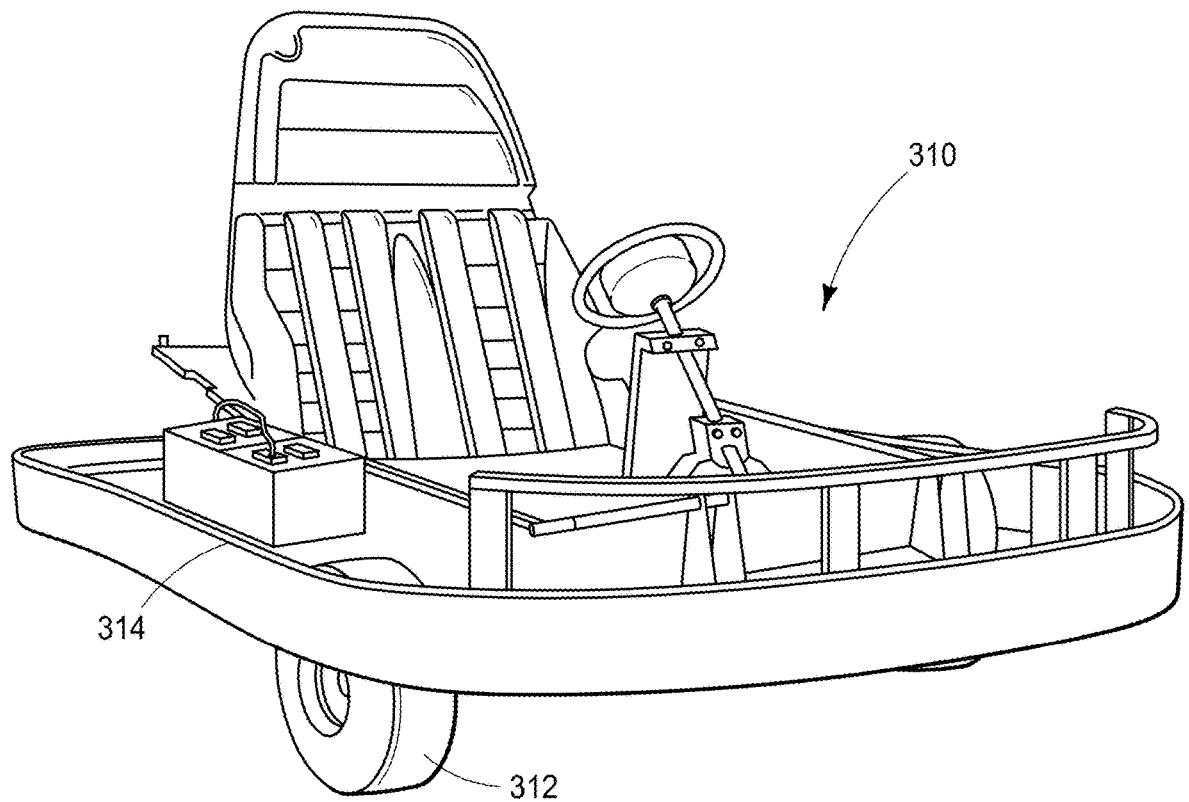
FIG. 31 is a depiction of a passenger operated amusement kart according to an embodiment of the disclosure.

Referring next to FIG. 31, kart 310 can be elevated in comparison to traditional amusement karts, in that the top edge of bumper rail 314 can be above wheel 312 wherein wheel 312 is approximately a 12-inch wheel, elevating kart 310 to at least 4 inches above the track surface.

Figure 32:
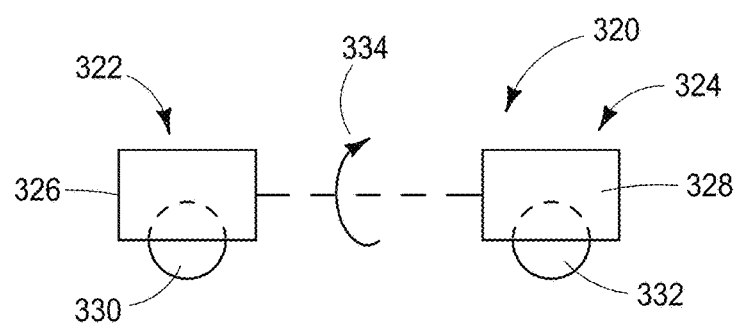
FIG. 32 is a depiction of an articulating passenger operated amusement kart according to an embodiment of the disclosure.

Referring next to FIG. 32, a passenger operated amusement kart 320 is shown that includes an articulating chassis. Accordingly, there is an articulating portion 334 between portions 322 and 324. The portions can be associated with the front end 326 and rear end 328 of the kart. Accordingly, the front wheels 330 and rear wheels 332 are likewise arranged in relation to the articulating portion 334.

The kart can have at least one articulating assembly between two portions of the chassis but additional portions are contemplated. The two portions of the chassis are operably associated with wheels of the kart. The articulating assembly can include bearings operably engaged between the two portions. The articulating assembly can be located to the rear of the passenger seat.

Figure 33:
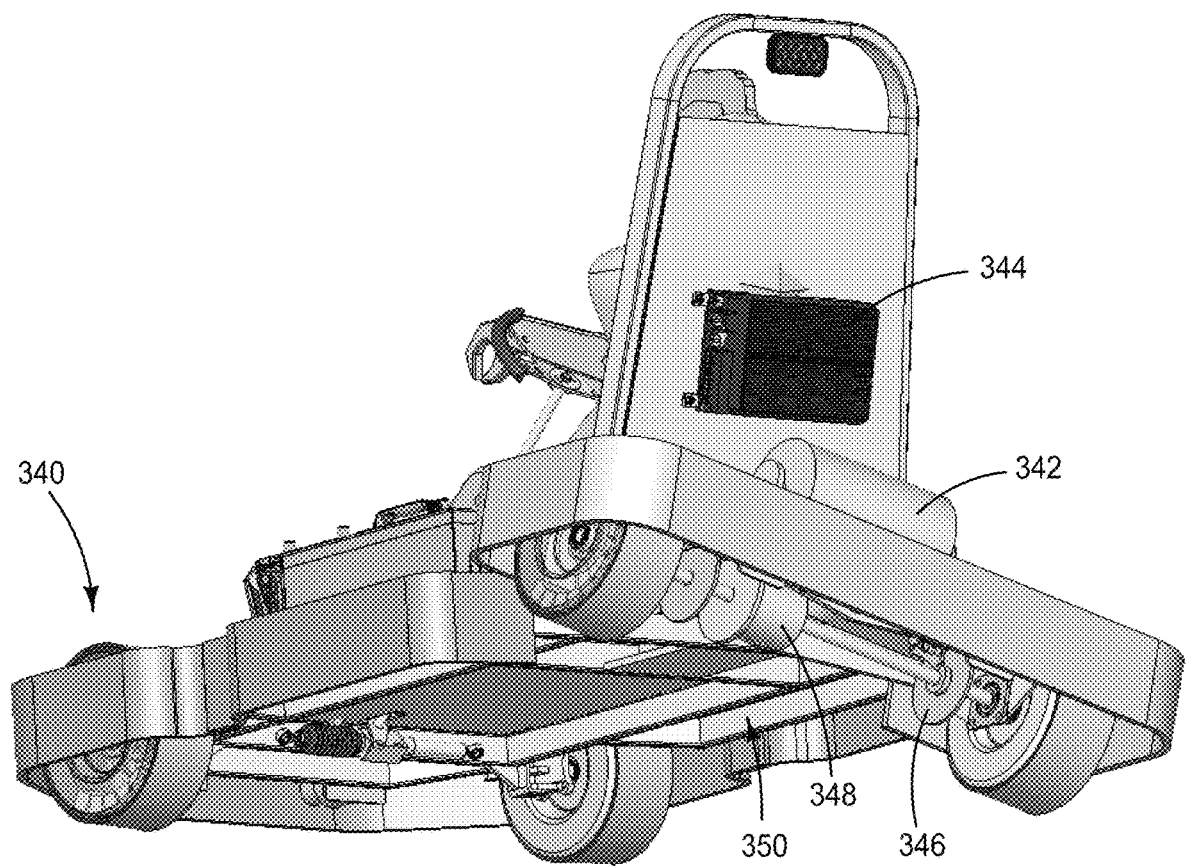
FIG. 33 is a depiction of an articulated passenger operated amusement kart according to an embodiment of the disclosure.
Figure 34:
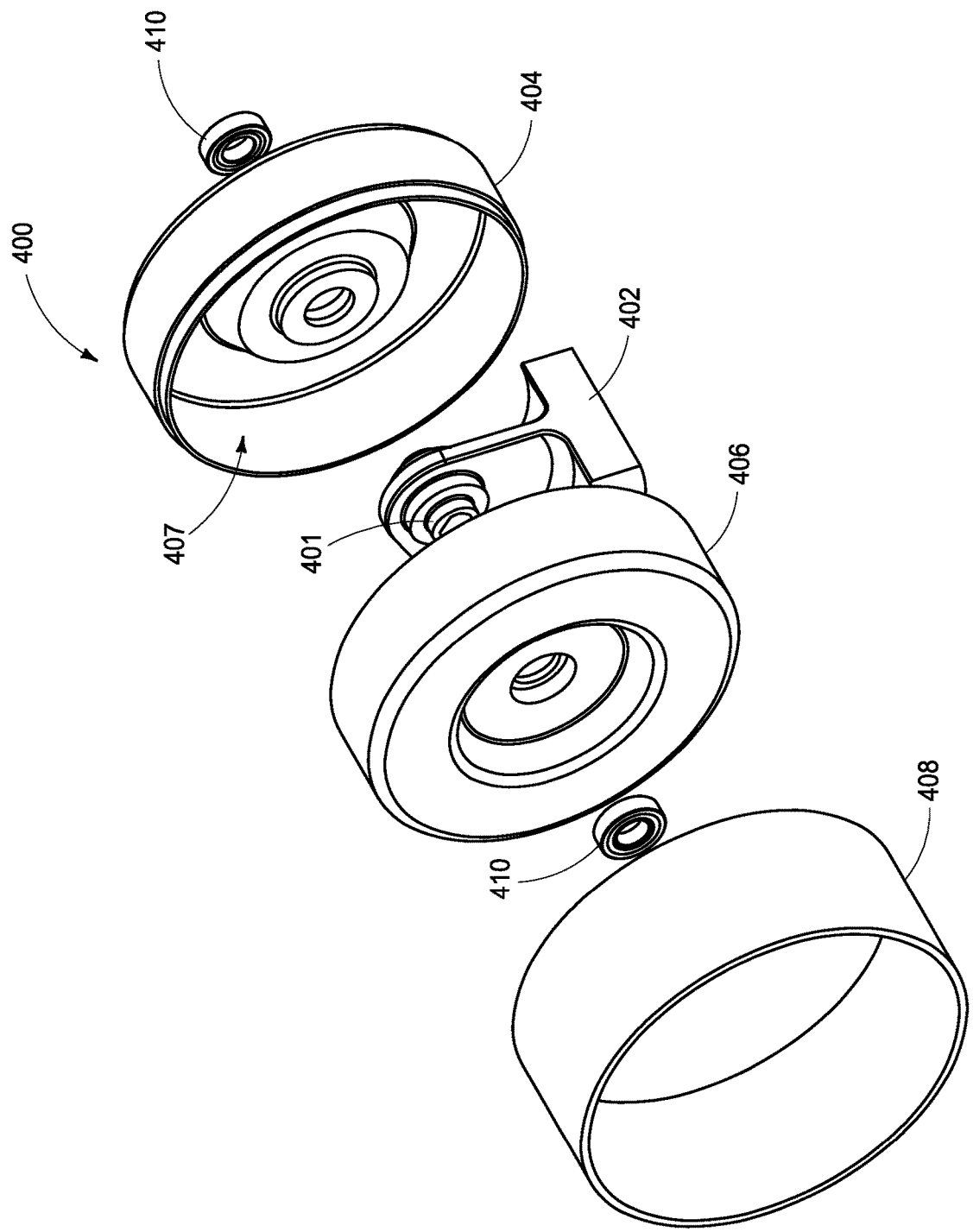
FIG. 34 is a depiction of a magnet amusement kart wheel according to an embodiment of the disclosure.
Figure 36:
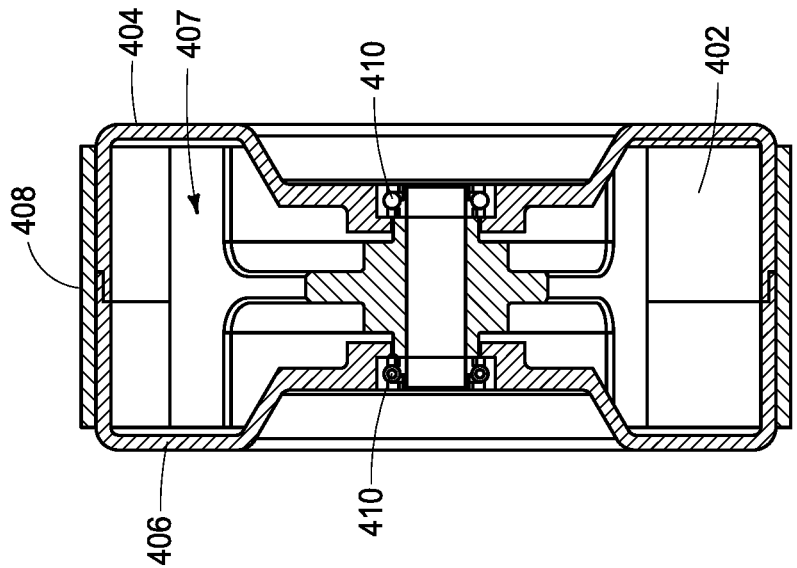
FIG. 36 is a cross sectional view of the wheel of FIGS. 35 and 34 according to an embodiment of the disclosure.
Figure 35:
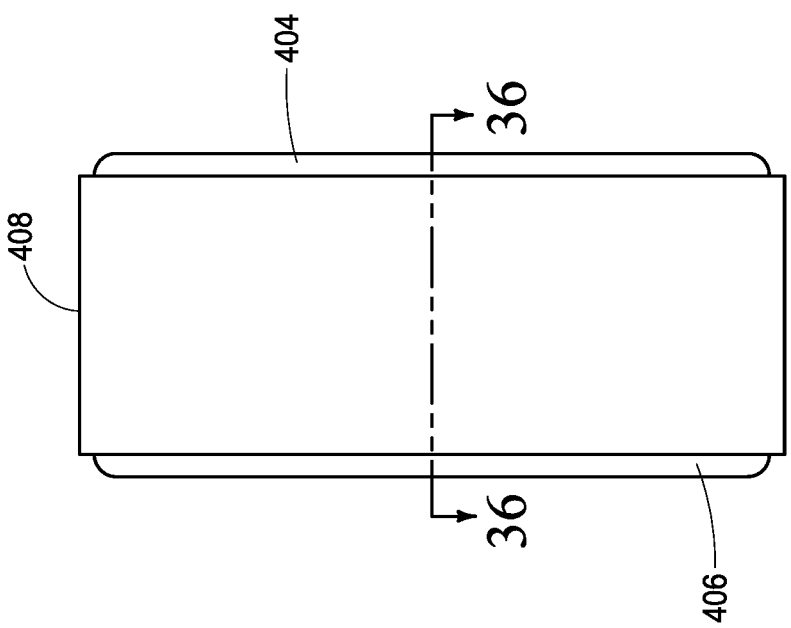
FIG. 35 is another depiction of the wheel of FIG. 34 according to an embodiment of the disclosure.
Figure 37:
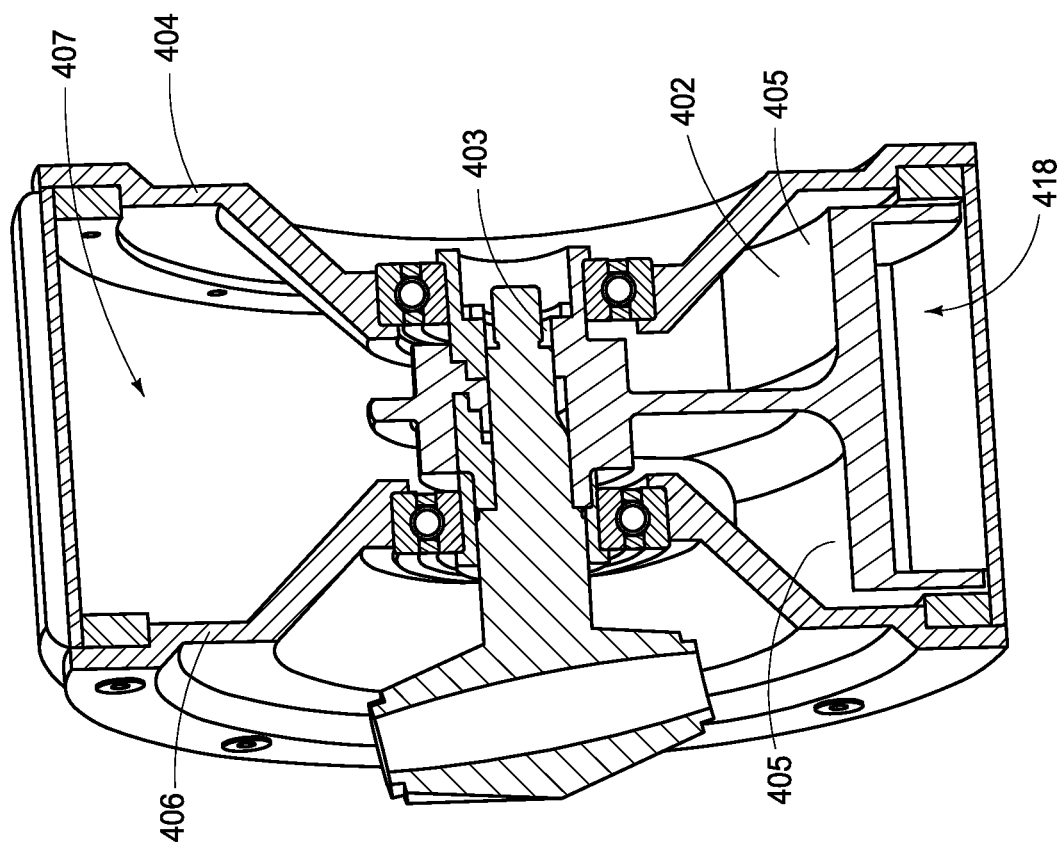
FIG. 37 is another cross-sectional isometric view of the wheel of FIGS. 34-36 according to an embodiment of the disclosure.

Referring next to FIG. 33, kart 340 can include a processing circuitry 344 associated with the back seat portion of kart 340 that can provide a programmable system, allowing total control of the kart to enable speed restriction where necessary for rider safety and remote operator control to penalize unsafe behavior. In accordance with example implementations, motor 342 can be a high output DC motor, capable of 150 foot-pounds of torque at the wheels to tackle the steepest inclines. The motor can be coupled to the drive shaft using a timing belt for quiet, maintenance-free operation, for example. In accordance with example implementations, brake 346 can be a dual disc brake assembly for improved stopping and safety, for example. In addition, kart 340 can have an articulated portion 350 that can articulate the rear portion of the kart plus or minus 15 degrees in relation to the front portion of the kart on the drive train assembly to ensure, in a four-wheel embodiment, that all four wheels are in contact with the surface of the track at all times.

Additionally, kart 340 can include a limited slip differential 348 that can provide a smooth ride and maximum traction in very sharp corners, for example. With regard to the restraint system and steering wheel assembly 180 described with reference to FIG. 20, the system can include a restraint system that will significantly reduce unload and load times. For example, the rear of the kart or seating position can include an over the shoulder restraint and separate hip restraint. Both are actuated with a hydraulic cylinder restraint, for example. In accordance with example implementations, the steering wheel can be configured to lift up and out of the way, making getting in and out of the seat much easier. These three elements, the over the shoulder and lap restraints and the steering wheel can all be operatively engaged with the processing circuitry associated with the kart, thereby enabling the amusement park operator to disengage and engage these restraint systems upon entry and exit of the amusement karts.

Utilizing the articulated chassis, methods for traversing a passenger operated amusement kart track are provided that can include transitioning the kart between two different shaped portions of the track, with the transition causing the kart to articulate about portions of the kart chassis. Referring to earlier figures, the first shaped portion is substantially flat and the second shaped portion is substantially curved and during this transition, the wheels of the kart remain in contact with the track. Accordingly, rear wheels of the kart articulate in relation to front wheels of the kart.

Referring next to FIGS. 34-37, an exploded view of a magnet wheel assembly 400 is shown. Assembly 400 is configured to rotate on a fixed axle with magnet component 402 fixed in a down position in relation to rotating wheel components 404, 406, and 408. Magnet component 402 can be operatively coupled to bearings 410 and move independently from wheel components 404, 406, and 408 in relation to a fixed axle. Accordingly, magnet component 402 can run on a bare hub or support member 401, or have a separate tread affixed to the outside surface. Wheel assembly 400 can define at least one recess 407 between components 404 and 406. Options for a separate tread can include a cast urethane tread, slip-on or bonded elastomeric tread, for example urethane or rubber tread, or a replaceable non-magnetic metal ring, for example. Magnet component 402 can include magnets and remain in position towards the ferromagnetic surface, which is typically the surface supporting the kart with which the wheels render mobile. The magnet component 402 may be fixed relative to the central axle, or may be free floating, such that a wheel can spin and the magnet maintain position. Accordingly, magnet component 402 can have an axel rotate within using bearings 410. Component 402 can be rotatably mounted to support member 401 and define a triangular configuration or suspension 417 in at least one cross section.

Figure 39:
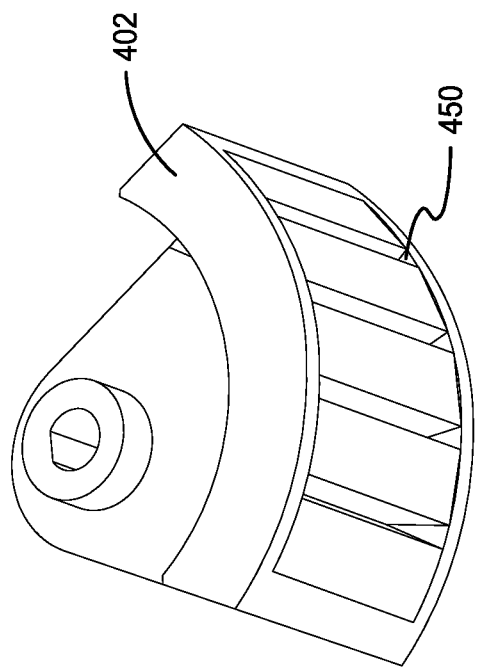
FIG. 39 is another view of the component of the magnetized wheel assembly according to an embodiment of the disclosure.
Figure 38:
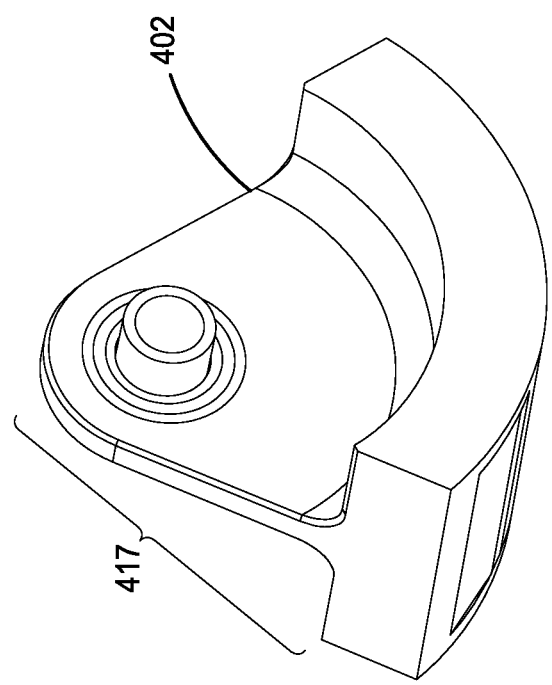
FIG. 38 is an isometric view of a component of a magnetized wheel according to an embodiment of the disclosure.

Refers next to FIGS. 38 and 39, any plurality of magnets may be arranged in either a north-south arrangement or a Halbach array, as shown at 450 in FIG. 39. In a north-south array, for example, the use of a back iron ay be used to aid in directing the magnetic field outward from the wheel axis. In a Halbach Array, the orientation of the magnets can be such that the magnetic field is oriented outward from the wheel axis. The thickness of tread 408 can be minimized to allow close proximity of the magnet force to the ferromagnetic support surface.

Figure 40:
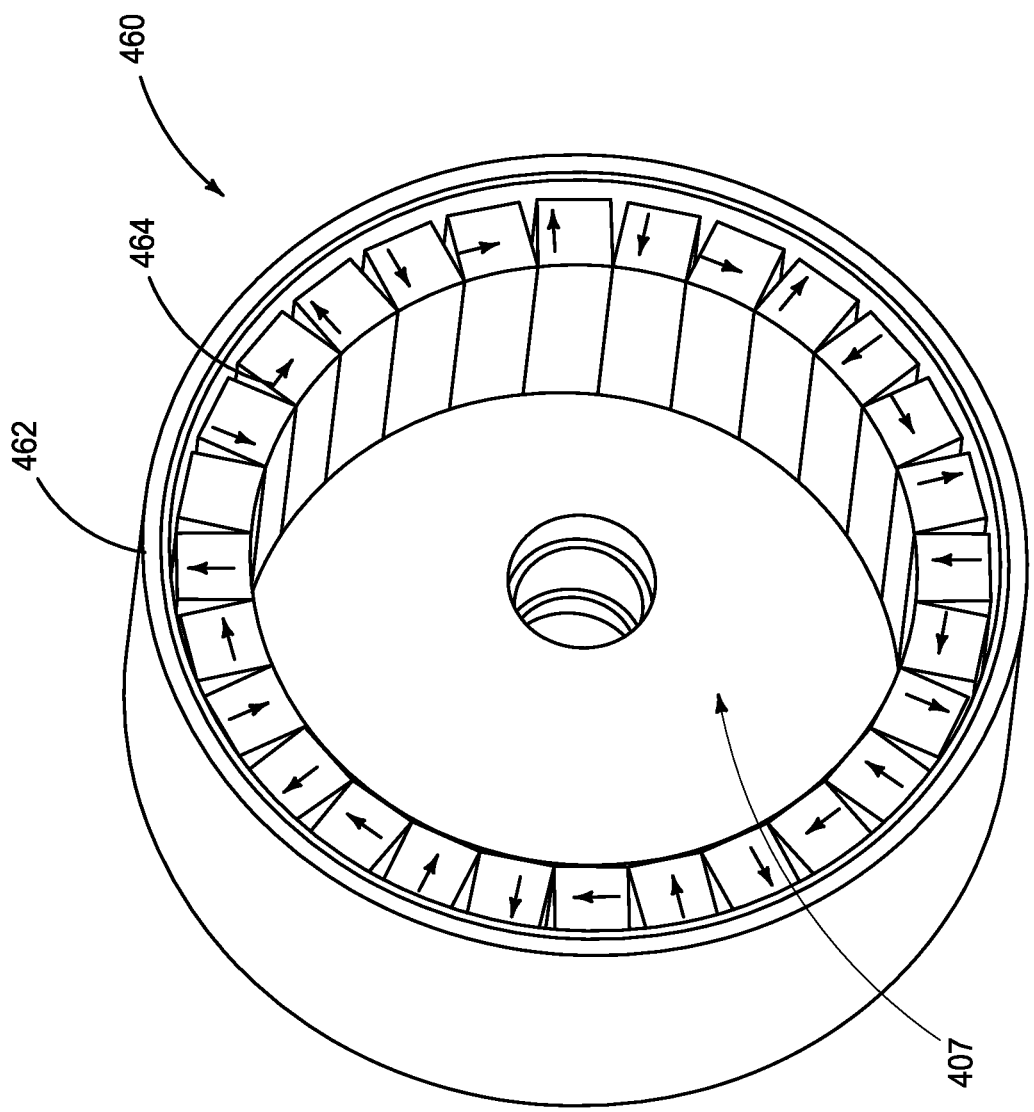
FIG. 40 is an open view of a magnetized wheel assembly according to an embodiment of the disclosure.
Figure 41:
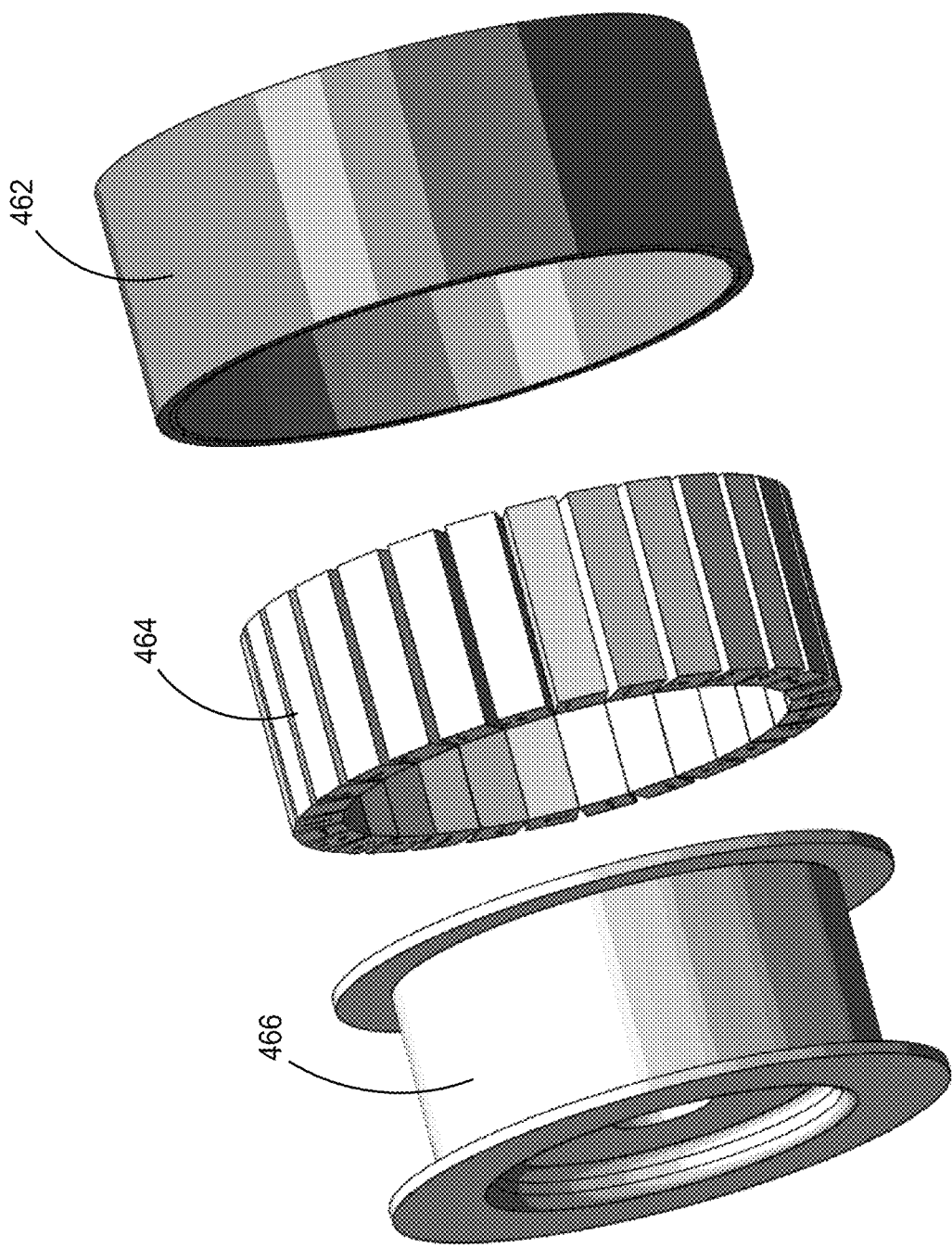
FIG. 41 is an exploded view of a magnetized wheel assembly according to an embodiment of the disclosure.

Referring next to FIGS. 40-41, a magnet wheel assembly 460 is shown. In accordance with example implementations, wheel assembly 460 can include tread 462 about magnetic components 464 about a hub 466. In accordance with example implementations, hub 466 can be arranged with magnets 464 continuously around the outer diameter of the wheel and inside tread 462. In accordance with example implementations, a tread ring can cover the outer diameter of hub 466 and separate magnets 464 from the support surface which can be a ferromagnetic support surface. A thickness of tread 462 can be minimized to allow close proximity of the magnet face to the road surface. Magnets 464 can be arranged in a north-south array or a Halbach Array in a manner such that a magnetic attraction to the ferromagnetic road surface is relatively uniform as the wheel rotates.

Accordingly, a passenger operated amusement kart wheel assembly is provided that can include a kart wheel defining a recess within the wheel and magnetized material within the recess. The assembly can include a member 401 within the recess and extending between sides of the wheel, and the magnetized material 290 (See FIG. 29, for example) is suspended by the member.

The wheel assembly can also include a frame 402 defining another recess 403 configured to receive the member, the frame rotatably mounted to the member about the recess.

Figure 29:
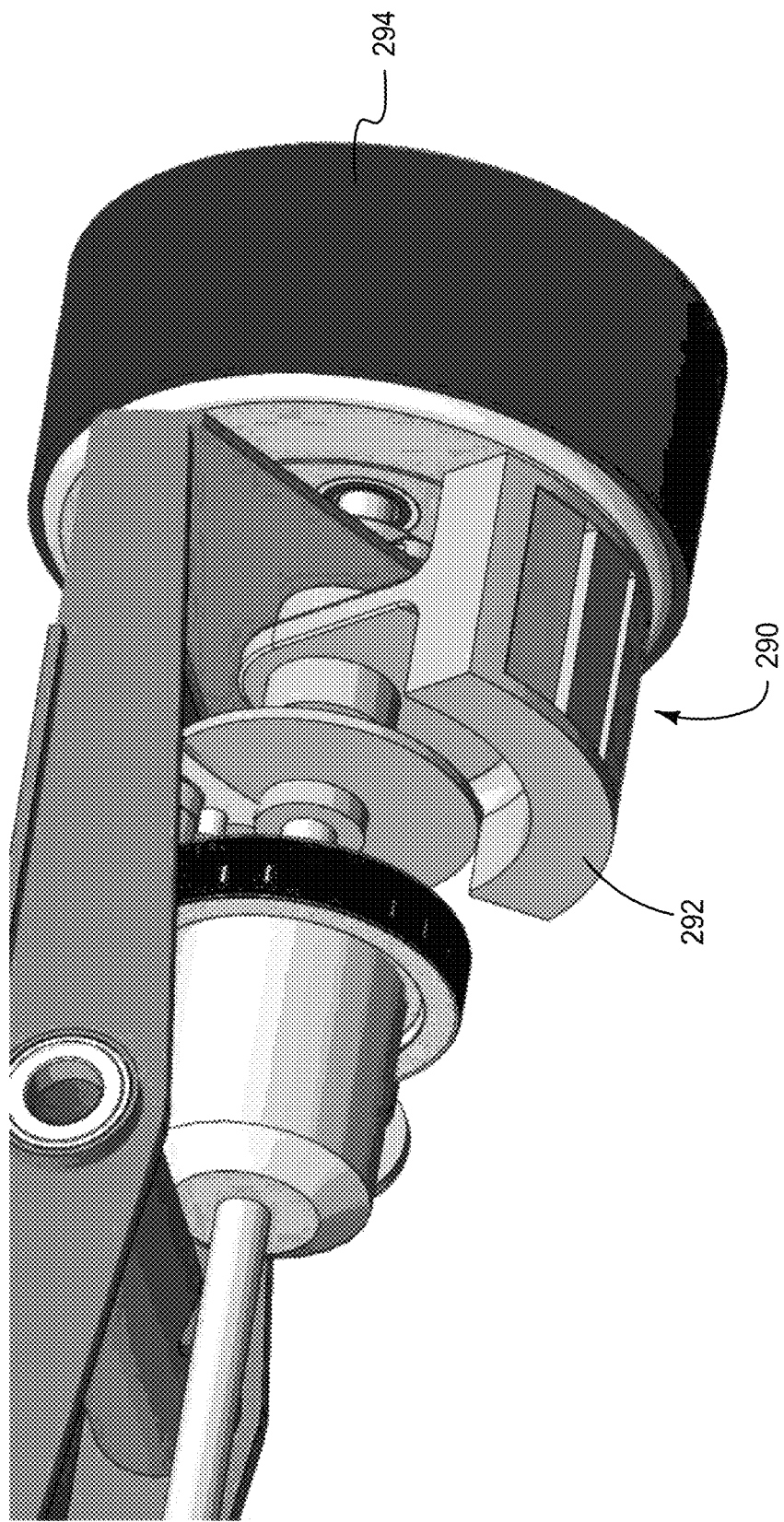
FIG. 29 is another depiction of an amusement kart magnet assembly according to an embodiment of the disclosure.
Figure 30:
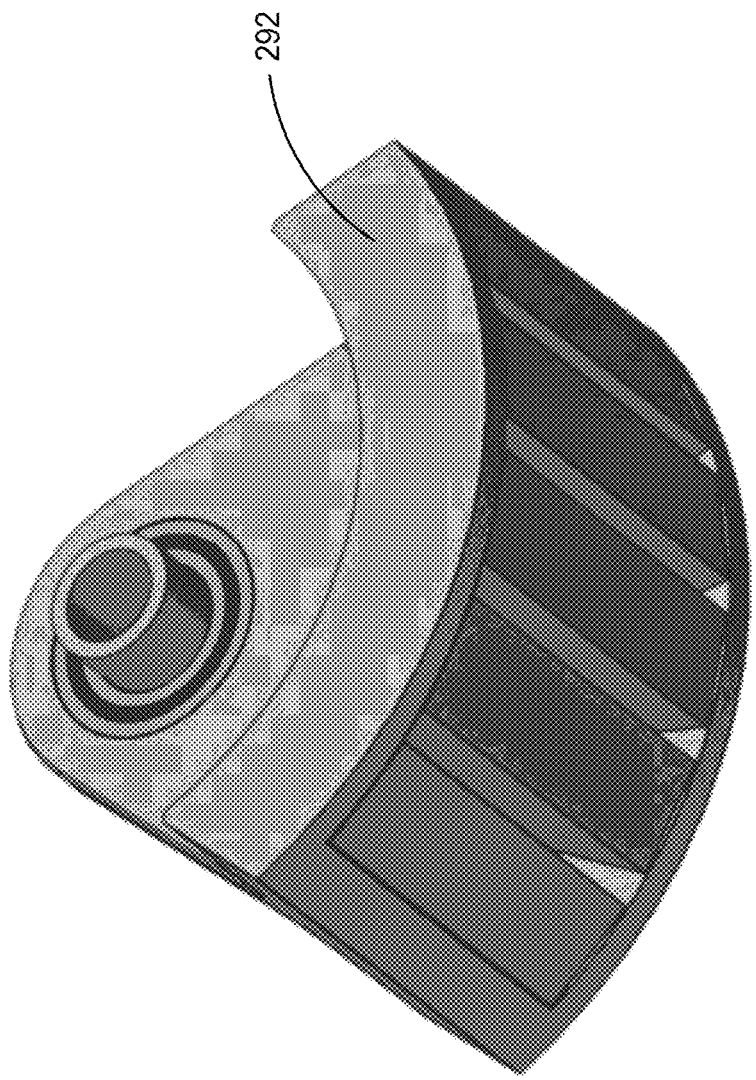
FIG. 30 is a depiction of a component of an amusement kart magnet assembly according to an embodiment of the disclosure.

The frame can extend from the recess triangularly as shown in FIG. 29, for example, in at least one cross section to support the magnetized material 290 proximate the tread of the wheel. The frame extends to form an arcuate support for the magnetized material.

The frame can extend from the recess to define opposing flanges 405 extending normally the length of the frame in at least one cross section.

Methods for engaging a passenger operated amusement kart to a track can include: providing magnetized material within a wheel of the kart; and magnetically coupling the material with magnetized material of the track, the coupling engaging the kart with the track.

Magnets in general pick up all kinds of magnetic material and can get fouled quickly. Housing the magnets inside a wheel can provide this self-cleaning benefit (stuff that sticks to the bottom of the wheel will fall off as the tread rotates away from the magnet), while permanent magnets outside the wheel may get fouled. Accordingly, embodiments utilizing an electro-magnet may be beneficial. Additionally, the intensity of the electro-magnet can be adjusted when needed (e.g., on board controller senses the kart approaching bunny hops and turns up the magnets to allow more negative g capability).

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A passenger operated amusement kart wheel assembly comprising:
   a kart wheel defining at least one recess within the wheel;
   magnetized material within the one recess;
   a magnetized material support member within the one recess and extending between sides of the wheel, the magnetized material being suspended by the magnetized material support member within the one recess;
   a frame within the one recess and defining another recess configured to receive the magnetized material support member, the frame rotatably mounted to the magnetized material support member about the other recess; and
   wherein the frame defines a triangular suspension in at least one cross section to support the magnetized material proximate tread of the wheel.

2. A passenger operated amusement kart wheel assembly comprising:
   a kart wheel defining at least one recess within the wheel;
   magnetized material within the one recess;
   a magnetized material support member within the one recess and extending between sides of the one recess, the magnetized material being suspended by the magnetized material support member within the one recess;
   a frame defining another recess configured to receive the magnetized material support member, the frame rotatably mounted to the magnetized material support member about the other recess; and wherein the frame forms an arcuate support for the magnetized material.

3. A passenger operated amusement kart wheel assembly comprising:
   a kart wheel defining at least one recess within the wheel;
   magnetized material within the one recess;
   a magnetized material support member within the one recess and extending between sides of the wheel, the magnetized material being suspended by the magnetized material support member within the one recess;
   a frame defining another recess configured to receive the magnetized material support member, the frame rotatably mounted to the magnetized material support member about the other recess; and
   wherein the frame extends from the recess to define opposing flanges extending normally the length of the frame in at least one cross section.

* * * * *